(12) United States Patent
Hotta et al.

(10) Patent No.: US 10,919,483 B2
(45) Date of Patent: Feb. 16, 2021

(54) AIRBAG FOR STEERING WHEEL

(71) Applicant: TOYODA GOSEI CO., LTD., Kiyosu (JP)

(72) Inventors: Masashi Hotta, Kiyosu (JP); Koji Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 158 days.

(21) Appl. No.: 16/227,095

(22) Filed: Dec. 20, 2018

(65) Prior Publication Data

US 2019/0193671 A1 Jun. 27, 2019

(30) Foreign Application Priority Data

Dec. 21, 2017 (JP) .................................. 2017-245607
Oct. 19, 2018 (JP) .................................. 2018-197655

(51) Int. Cl.
*B60R 21/203* (2006.01)
*B60R 21/2338* (2011.01)
*B60R 21/216* (2011.01)
*B60R 21/233* (2006.01)

(52) U.S. Cl.
CPC ........ *B60R 21/2338* (2013.01); *B60R 21/203* (2013.01); *B60R 21/216* (2013.01); *B60R 21/233* (2013.01); *B60R 2021/23308* (2013.01); *B60R 2021/23382* (2013.01); *B60R 2021/23386* (2013.01)

(58) Field of Classification Search
CPC ... B60R 21/16; B60R 21/2338; B60R 21/203; B60R 21/216; B60R 21/233
USPC ........................................................ 280/731
See application file for complete search history.

(56) References Cited

U.S. PATENT DOCUMENTS 5,560,648 A * 10/1996 Rhule .................... B60R 21/16
                                                        280/731
9,738,242 B2 * 8/2017 Ishiguro ............... B60R 21/239
2003/0168842 A1* 9/2003 Igawa .................. B60R 21/233
                                                        280/743.2

(Continued)

FOREIGN PATENT DOCUMENTS

JP          2007-203820 A      8/2007
JP          2007203820 A   *   8/2007

OTHER PUBLICATIONS

Translation of JP2007203820A accessed at www.espacenet.com on Jul. 20, 2020. (Year: 2007).*

*Primary Examiner* — James A Shriver, II
*Assistant Examiner* — Hilary L Johns
(74) *Attorney, Agent, or Firm* — Posz Law Group, PLC

(57) ABSTRACT

An airbag for steering wheel is configured to inflate so as to cover an upper surface side of a ring part of a steering wheel. Outer peripheral edges of a vehicle body-side wall part and a driver-side wall part are joined such that the airbag is formed to have a bag shape, and an inlet opening is arranged at a vicinity of a center of the vehicle body-side wall part. The vehicle body-side wall part is formed with a concave part to be concave upward toward the driver-side wall part upon completion of the inflation so that a rear part-side region of the ring part can be entered into the concave part, and the concave part is arranged at the vehicle body-side wall part so that the ring part is entered into the concave part when a driver is received by the airbag upon completion of the inflation.

3 Claims, 25 Drawing Sheets

(56) References Cited

U.S. PATENT DOCUMENTS

| | | | |
|---|---|---|---|
| 2005/0098992 A1* | 5/2005 | Yamada | B60R 21/233 280/743.1 |
| 2006/0151976 A1* | 7/2006 | Abe | B29C 48/51 280/729 |
| 2011/0210533 A1* | 9/2011 | Adachi | B60R 21/217 280/728.2 |
| 2016/0288755 A1* | 10/2016 | Ishiguro | B60R 21/2037 |
| 2017/0088080 A1* | 3/2017 | Hotta | B60R 21/2037 |
| 2018/0281731 A1* | 10/2018 | Hotta | B60R 21/233 |

* cited by examiner

AIRBAG FOR STEERING WHEEL

CROSS-REFERENCE TO RELATED APPLICATION

This application claims priority from Japanese Patent Application No. 2017-245607, filed on Dec. 21, 2017, and Japanese Patent Application No. 2018-197655, filed on Oct. 19, 2018, the entire subject matter of which is incorporated herein by reference.

TECHNICAL FIELD

The present invention relates to an airbag for steering wheel configured to allow an inflation gas to flow therein, thereby inflating to cover an upper surface side of a steering wheel.

BACKGROUND ART

In the related art, an airbag for steering wheel is available which is configured to allow a vehicle body-side wall part arranged at a steering wheel side to protrude toward a ring part of the steering wheel and to cover a periphery of the ring part by the protruding part, so as to stably receive a driver, upon completion of the inflation (for example, refer to Patent Document 1)

Patent Document 1: JP-A-2007-203820

In the above airbag for steering wheel, an airbag includes a first bag configured to inflate so as to cover an upper surface side of the steering wheel and a second bag configured to inflate at the vehicle body-side wall part side (between the ring part and the first bag), and the second bag is configured to inflate with protruding from the first bag so as to cover the periphery of the ring part over a substantially entire circumference so that the first bag does not deviate with respect to the steering wheel upon completion of the inflation. For this reason, a volume of the airbag increases, the configuration is complicated and storability of the airbag in the steering wheel is not favorable.

The present invention has been made in view of the above situations, and an object thereof is to provide an airbag for steering wheel capable of smoothly protecting a driver with a simple configuration.

SUMMARY OF INVENTION

According to an aspect of the invention, there is provided an airbag for steering wheel configured to allow an inflation gas to flow therein to inflate so as to cover an upper surface side of a ring part of a steering wheel, and comprising a vehicle body-side wall part to be arranged at a steering wheel side and a driver-side wall part to be arranged at a driver side upon completion of the inflation, wherein outer peripheral edges of the vehicle body-side wall part and the driver-side wall part of which outer shapes are made to substantially coincide with each other are joined such that the airbag is formed to have a bag shape, and an inlet opening which is opened so as to allow the inflation gas to flow therein and of which a peripheral edge is attached to the steering wheel side is arranged at a vicinity of a center of the vehicle body-side wall part, the vehicle body-side wall part is formed with a concave part to be concave upward toward the driver-side wall part upon completion of the inflation so that a rear part-side region of the ring part can be entered into the concave part, and the concave part is arranged at the vehicle body-side wall part so that the ring part is entered into the concave part when a driver is received by the airbag upon completion of the inflation.

DESCRIPTION OF EMBODIMENTS

Figure 1:
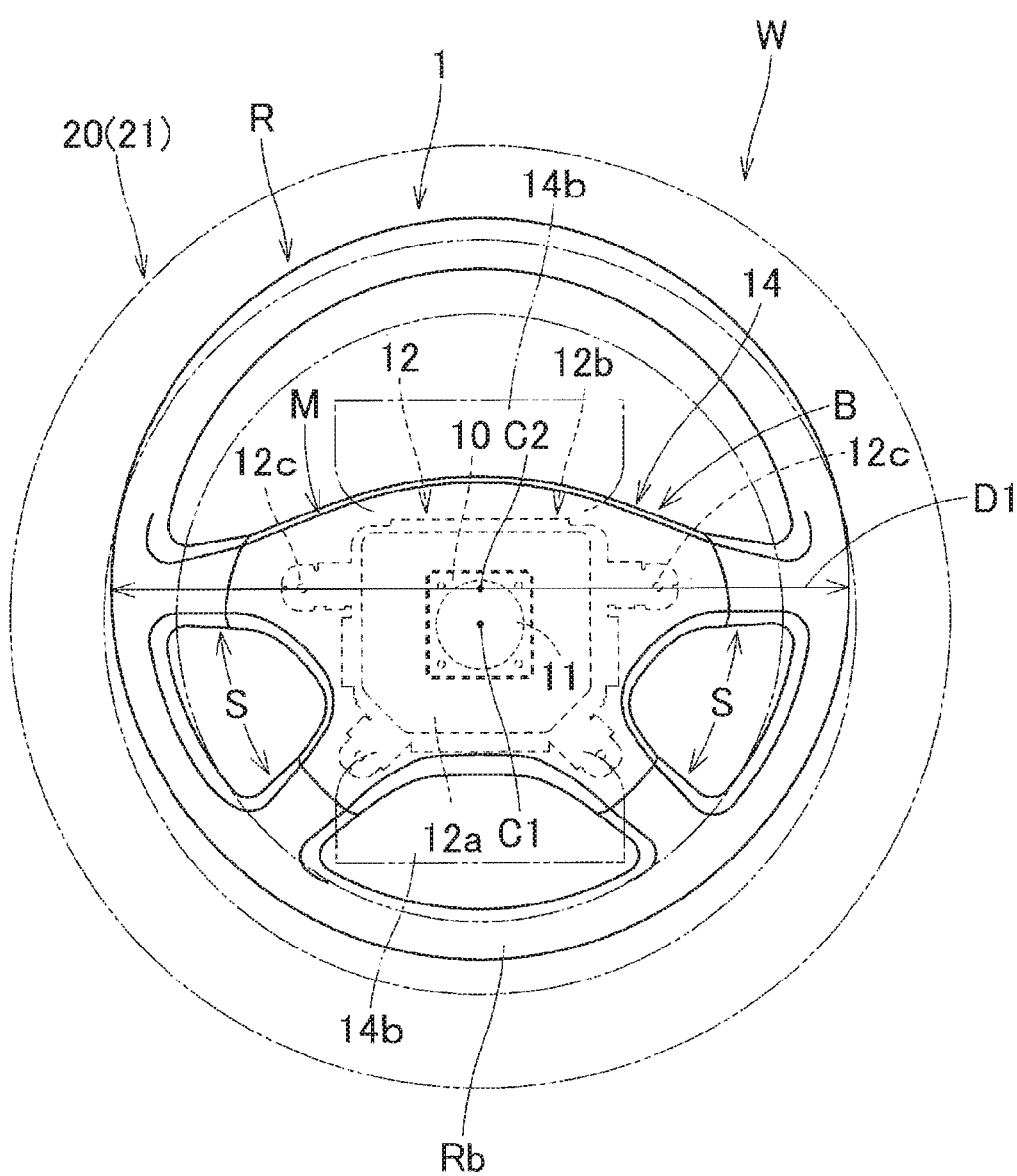
FIG. 1 is a schematic plan view depicting an airbag device for steering wheel in which an airbag for steering wheel in accordance with a first illustrative embodiment of the present invention is used.
Figure 2:
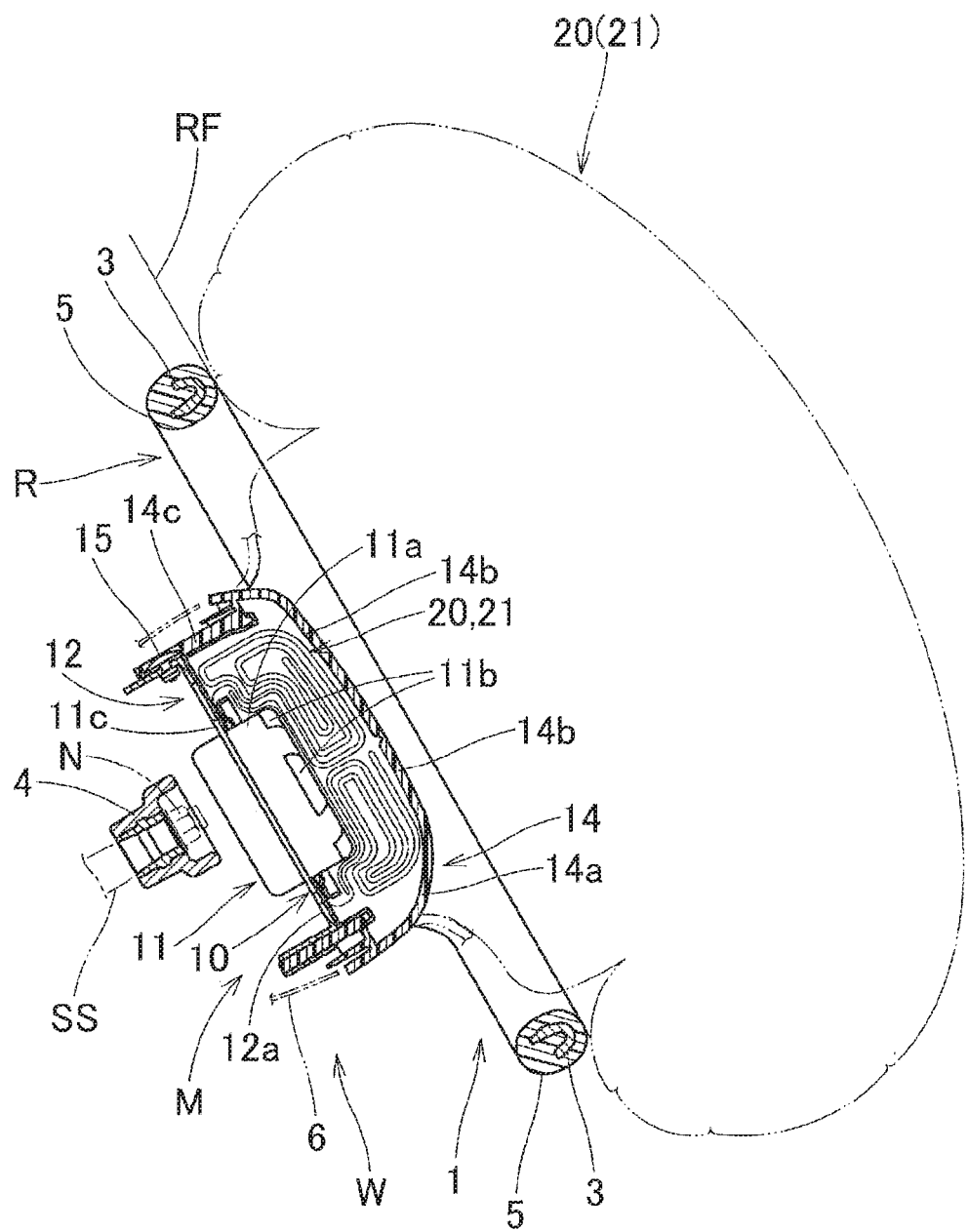
FIG. 2 is a schematic longitudinal sectional view of the airbag device for steering wheel of FIG. 1 mounted to a vehicle.
Figure 3:
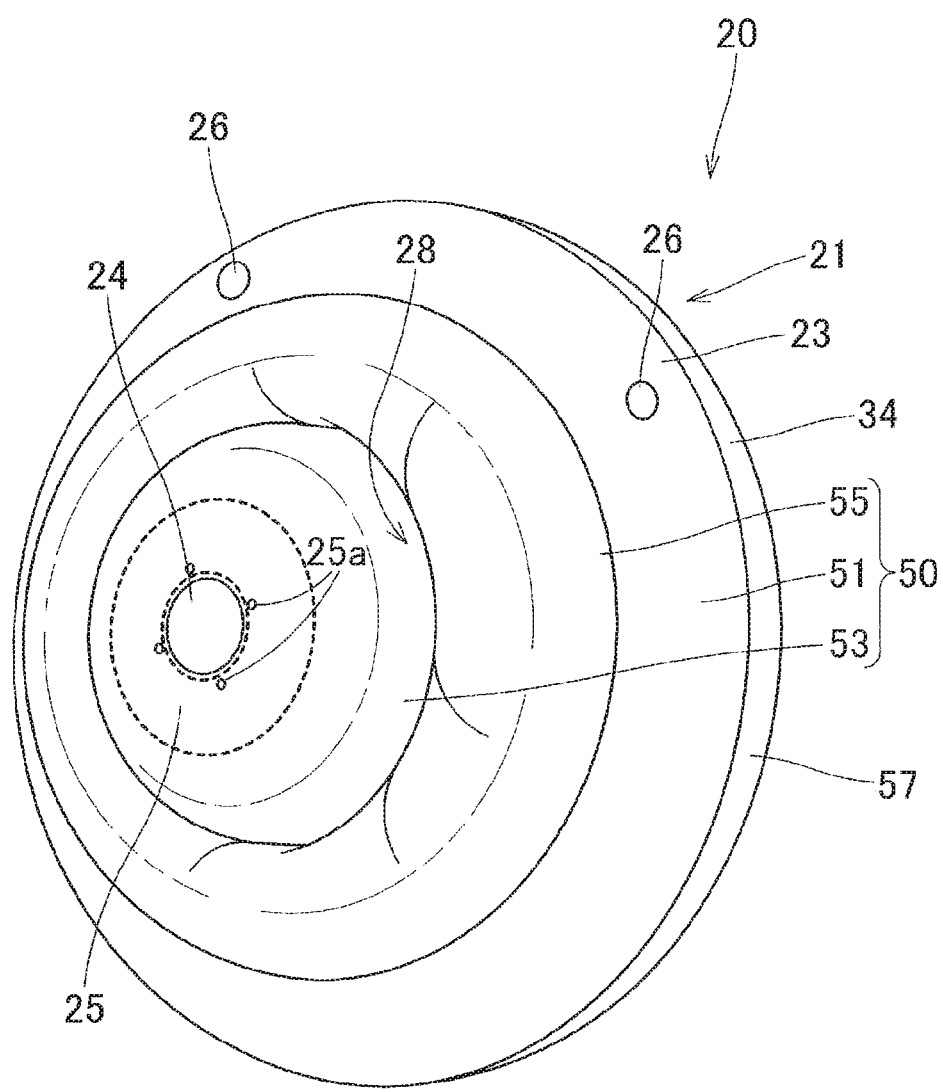
FIG. 3 is a perspective view of a single inflated airbag, which is to be used for the airbag device for steering wheel of FIG. 1, as seen from below.

Hereinafter, illustrative embodiments of the present invention will be described with reference the drawings. An airbag for steering wheel (hereinafter, referred to as "airbag") of a first illustrative embodiment is used for an airbag device M for steering wheel (hereinafter, referred to as "airbag device") that is to be mounted to a steering wheel W as shown in FIGS. 1 and 2. The steering wheel W includes a steering wheel main body 1 and the airbag device M arranged at an upper part of a central boss part B of the steering wheel main body 1. The steering wheel main body 1 has a circular ring-shaped ring part R, which is to be gripped upon steering, the boss part B arranged at a substantial center of the ring part R and coupled to a steering shaft SS, and a plurality of (four, in the illustrative embodiment) spoke parts S configured to couple the boss part B and the ring part R.

In the meantime, in the illustrative embodiment, unless mentioned otherwise, a front and rear direction, an upper and lower direction and a left and right direction are based on the straight forward steering of the steering wheel W mounted to the vehicle V. Specifically, the upper and lower direction along an axial direction of the steering shaft SS (refer to FIG. 2) to which the steering wheel W is mounted is referred to as the upper and lower direction, the front and rear direction of the vehicle V, which is perpendicular to the steering shaft SS, is referred to as the front and rear direction, and the left and right direction of the vehicle V, which is perpendicular to the steering shaft SS, is referred to as the left and right direction.

As shown in FIGS. 1 and 2, the steering wheel main body 1 includes metal inserts 3 arranged to couple the ring part R, the boss part B and the spoke parts S and made of metal such as aluminum alloy. A region of the metal insert 3 located at the ring part R side and a region of each spoke part S located at the ring part R are covered with a synthetic resin cover layer 5. Also, a metallic boss 4 for inserting the steering shaft SS therein and fixing the same with a nut N is arranged in a region of the metal insert 3 located at the boss part B. Also, a lower cover 6 provided to cover the lower of the boss part B and made of a synthetic resin is arranged at a lower part of the steering wheel main body 1.

As shown in FIGS. 1 and 2, the airbag device M is arranged at the substantially central boss part B of the steering wheel W, and includes an airbag 20 accommodated with being folded, an inflator 11 configured to supply an inflation gas to the airbag 20, a case 12 as an accommodation part configured to accommodate and hold therein the airbag 20 and the inflator 11, an airbag cover 14 for covering the folded airbag 20, and a retainer 10 for mounting the airbag 20 and the inflator 11 to the case 12.

As shown in FIG. 2, the inflator 11 has a substantially cylinder-shaped main body part 11a having a plurality of gas discharge ports 11b and a flange part 11c for mounting the inflator 11 to the case 12. The flange part 11c is formed with through-holes through which bolts (not shown) of the retainer 10 are respectively to pass.

As shown in FIG. 2, the case 12 as the accommodation part is made of a plate material, and has a substantially rectangular plate-shaped bottom wall part 12a to which the inflator 11 is inserted and mounted from below, and a peripheral wall part 12b extending vertically from an outer peripheral edge of the bottom wall part 12a. An upper end of the peripheral wall part 12b is formed with a mounting piece 12c extending outward (refer to FIG. 1), and a mounting substrate of a horn switch mechanism (not shown) is mounted to the mounting piece 12c. By using the mounting substrate (not shown), the case 12 is mounted and fixed to the metal inserts 3 of the steering wheel W, so that the airbag device M is mounted to an upper part of the boss part B of the steering wheel main body 1 mounted to the steering shaft SS. Also, a side wall part 14c of the airbag cover 14 is mounted to the peripheral wall part 12b of the case 12 by using a rivet 15 or the like (refer to FIG. 2). In the illustrative embodiment, the bolts (mounting means) (not shown) of the retainer 10 arranged in the airbag 20 are inserted through mounting holes 25a of a peripheral edge (a mounting part 25) of an inlet opening 24 of the airbag 20, the bottom wall part 12a of the case 12 and the flange part 11c of the inflator 11 and are then fixed with nuts (not shown), so that the airbag 20 and the inflator 11 are mounted to the bottom wall part 12a of the case 12. Specifically, as shown in FIG. 1, the airbag 20 is mounted to the bottom wall part 12a of the case 12 at a position at which a mounting center C1 (a center of the inlet opening 24) slightly deviates rearward with respect to a center C2 (a rotation center of the steering wheel W) of the ring part R of the steering wheel W.

The airbag cover 14 is made of a synthetic resin and has a ceiling wall part 14a configured to cover the upper side of the airbag 20 accommodated in the case 12 and a substantially rectangular tube-shaped side wall part 14c extending downward from a vicinity of an outer peripheral edge of the ceiling wall part 14a. The ceiling wall part 14a is formed with two door parts 14b, 14b configured to be pushed and opened by the airbag 20 being inflated.

As shown in FIGS. 3 to 6, the airbag 20 has a bag main body 21, a flow regulating cloth 37 arranged in the bag main body 21, and tethers 40 arranged in the bag main body 21.

Figure 4:
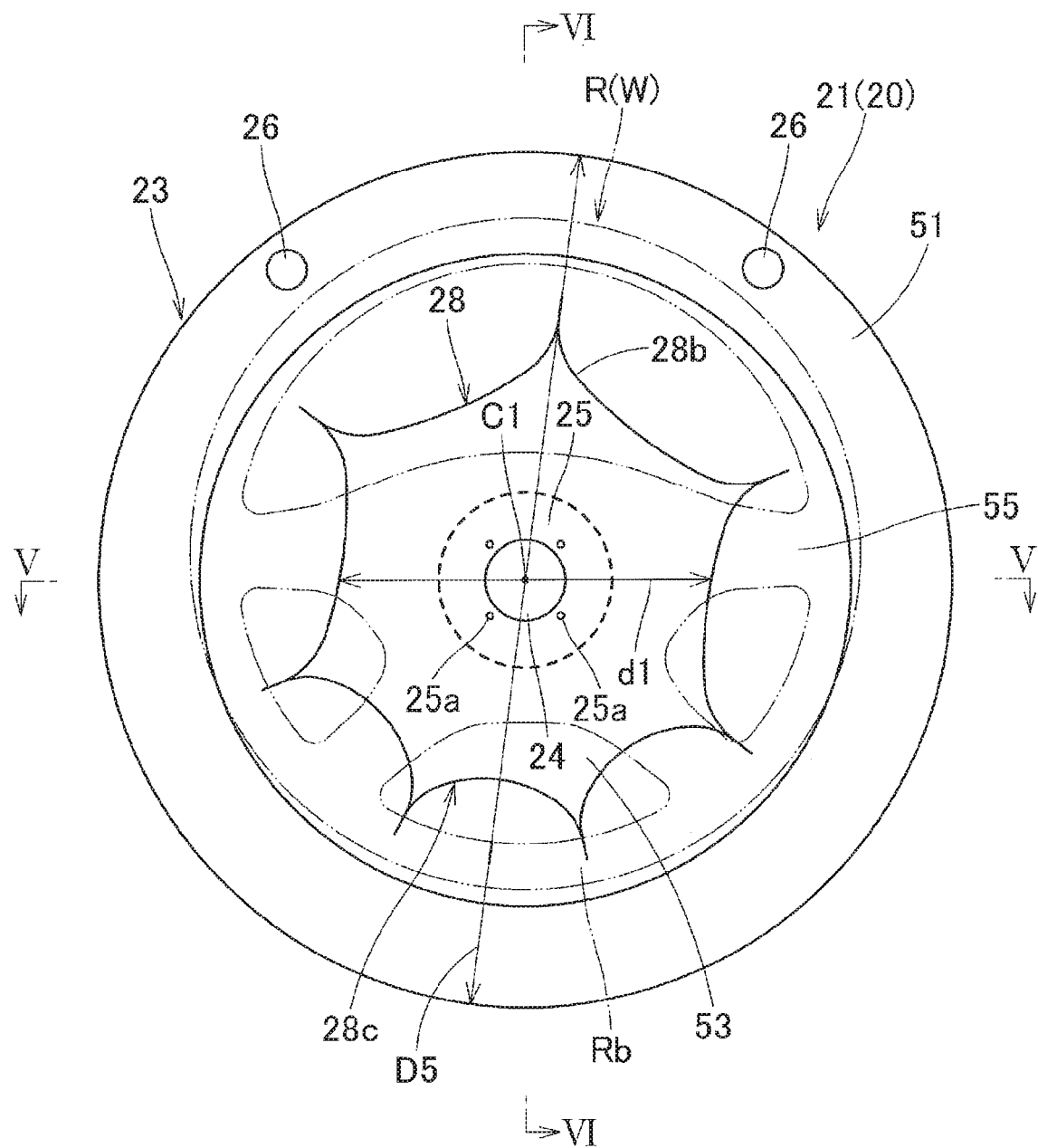
FIG. 4 is a bottom view of the single inflated airbag of FIG. 3.

The bag main body 21 has a flexible bag shape and is configured so that a shape thereof upon completion of the inflation is circular, as seen from above, and is substantially oval spherical close to a sphere, as seen from a side, as shown with the dashed-two dotted line in FIGS. 1 and 2 and FIG. 4. As described above, the bag main body 21 is mounted to the steering wheel W in a state where the mounting center C1 slightly deviates rearward with respect to the rotation center C2 of the steering wheel W, and is configured to cover an upper surface of the ring part R over a substantially entire surface upon completion of the inflation in the state where the mounting center C1 deviates (refer to the dashed-two dotted line in FIGS. 1 and 2 and FIGS. 4 and 9).

The bag main body 21 includes a vehicle body-side wall part 23 arranged at the steering wheel W side and a driver-side wall part 34 arranged at a driver MD side upon completion of the inflation, and in the illustrative embodiment, has a bag shape formed by joining outer peripheral edges of the vehicle body-side wall part 23 and the driver-side wall part 34 of which outer shapes are made to substantially coincide with each other as a substantially circular shape. The vehicle body-side wall part 23 is formed at a center with the inlet opening 24 having a substantially circular shape and provided to insert therein the main body part 11a of the inflator 11 from below and to introduce therein an inflation gas, which is to be discharged from the gas discharge ports 11b of the inflator 11. Also, in the bag main body 21 of the illustrative embodiment, a peripheral edge of the inlet opening 24 of the vehicle body-side wall part 23 is configured as a mounting part 25, and the mounting part 25 is formed with four mounting holes 25a in which the bolts (not shown) of the retainer 10 are to be inserted. Also, an outer peripheral edge 23a of the vehicle body-side wall part 23 is formed in a region adjacent to a front end with vent holes 26 for exhausting the extra inflation gas introduced into the bag main body 21 at two bilaterally symmetric positions.

Figure 5:
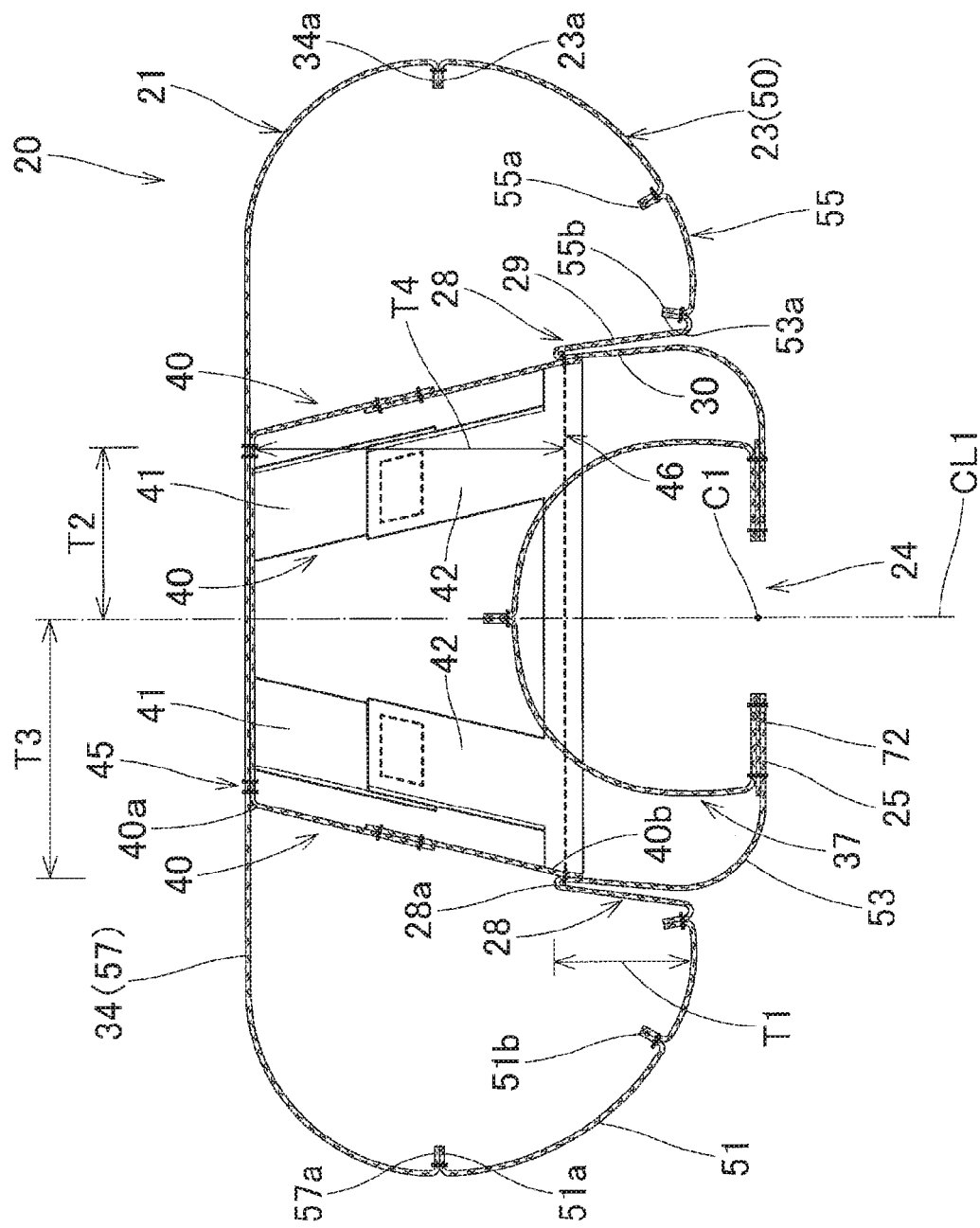
FIG. 5 is a sectional view taken along a line V-V of FIG. 4.
Figure 6:
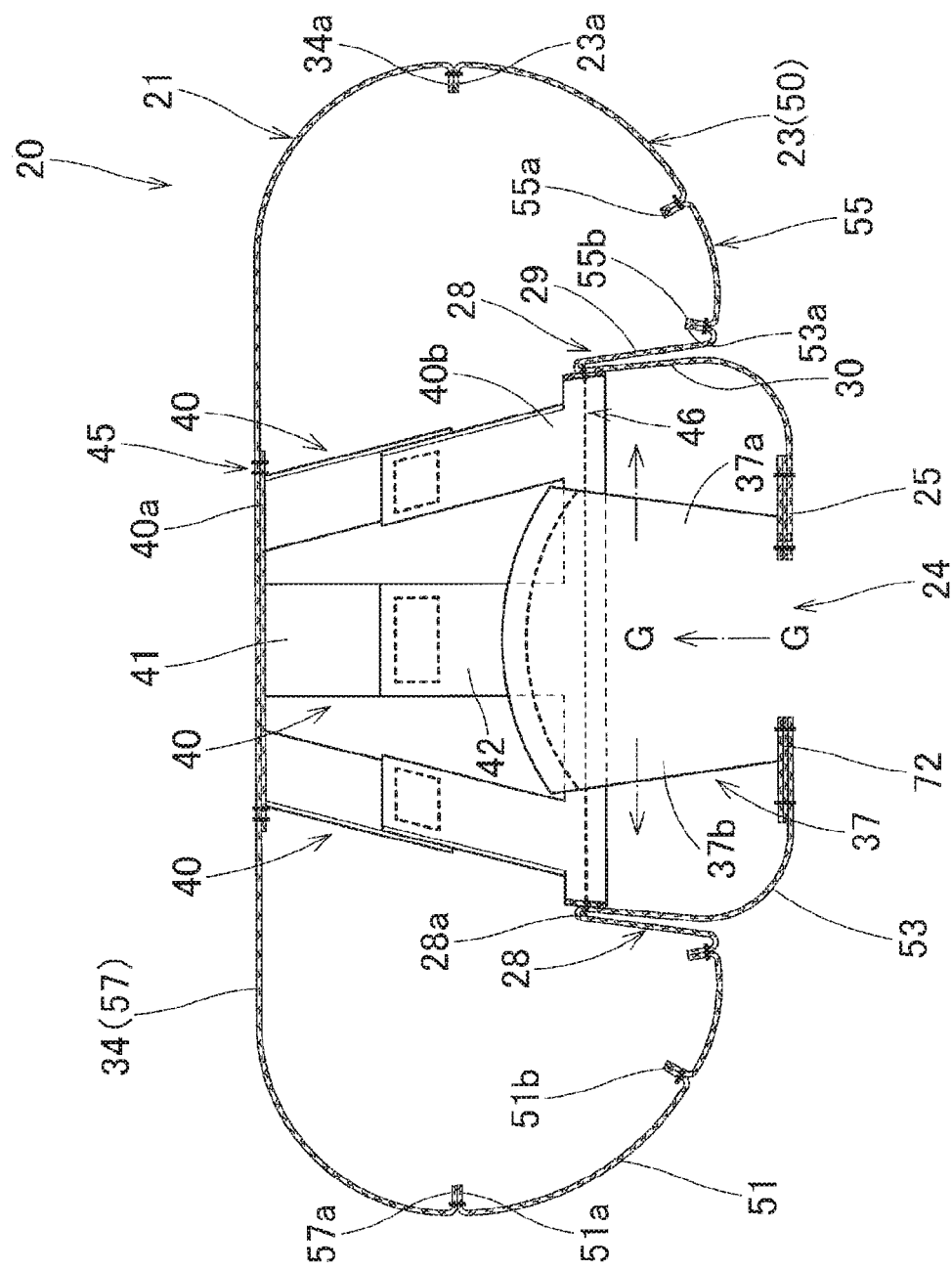
FIG. 6 is a sectional view taken along a line VI-VI of FIG. 4.
Figure 9:
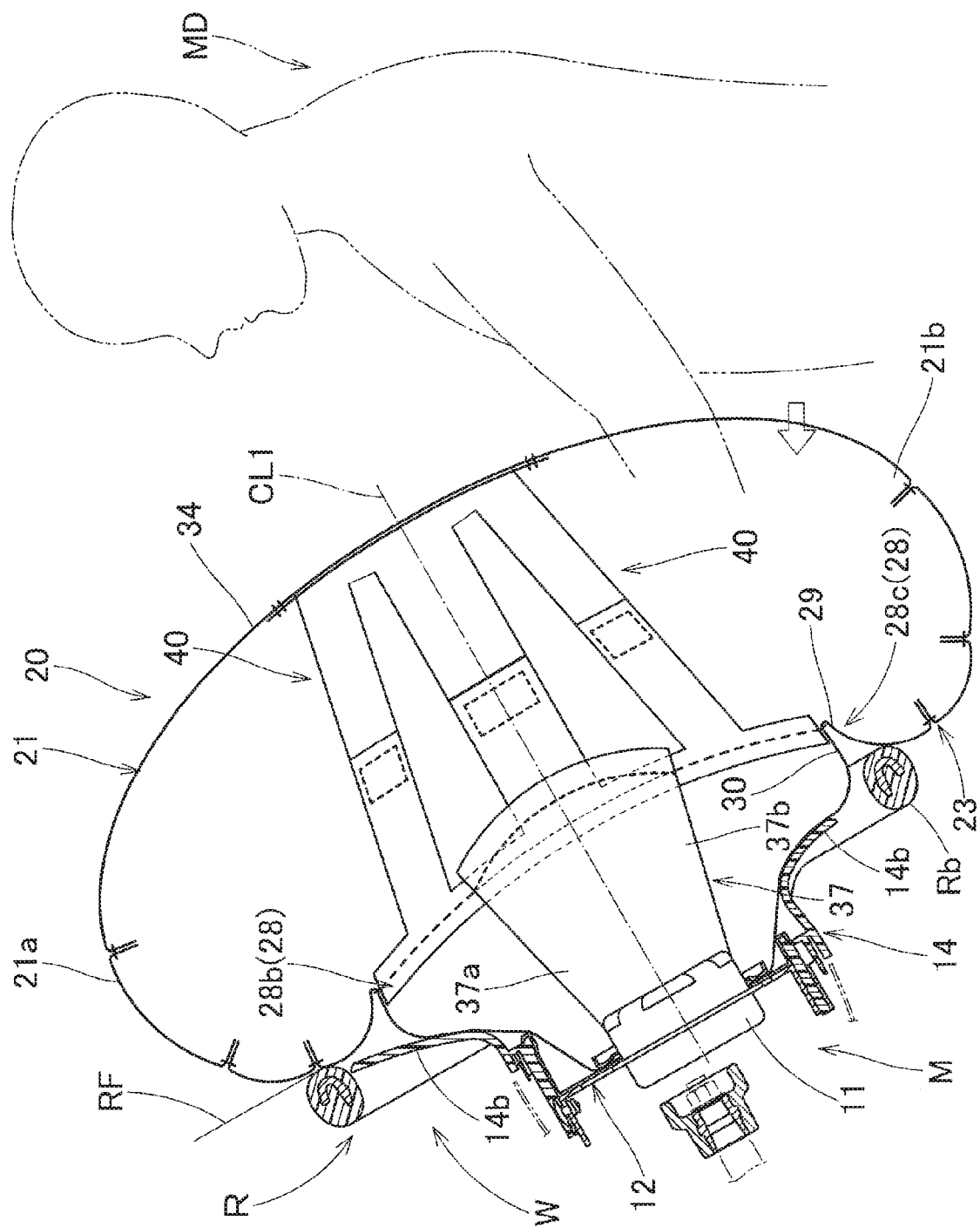
FIG. 9 is a schematic longitudinal sectional view depicting a state where inflation of the airbag has completed in the airbag device for steering wheel of the first illustrative embodiment.
Figure 10:
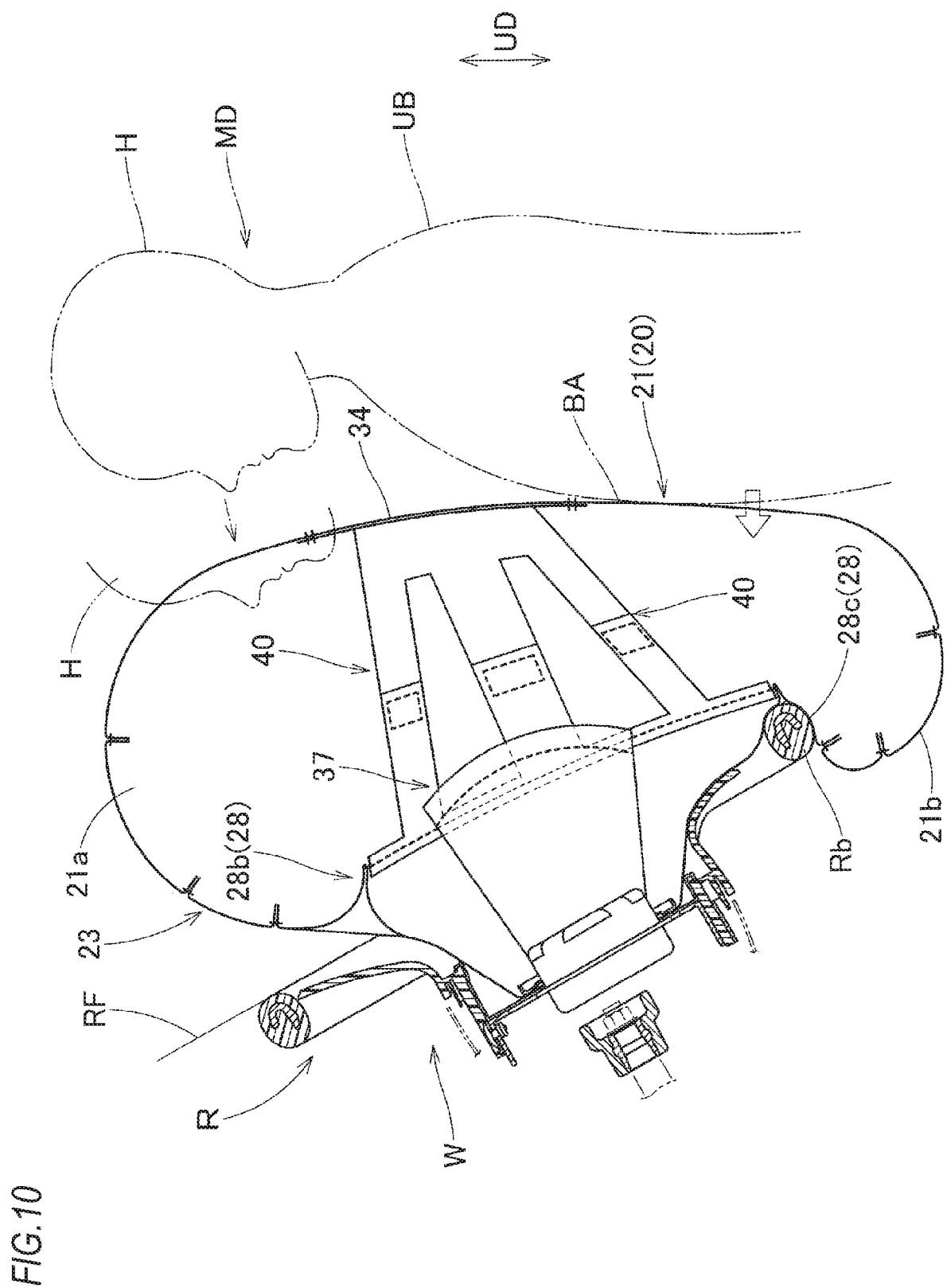
FIG. 10 is a schematic longitudinal sectional view depicting a state where the airbag after completion of the inflation in the airbag device for steering wheel of the first illustrative embodiment has received a driver moving forward.
Figure 11:
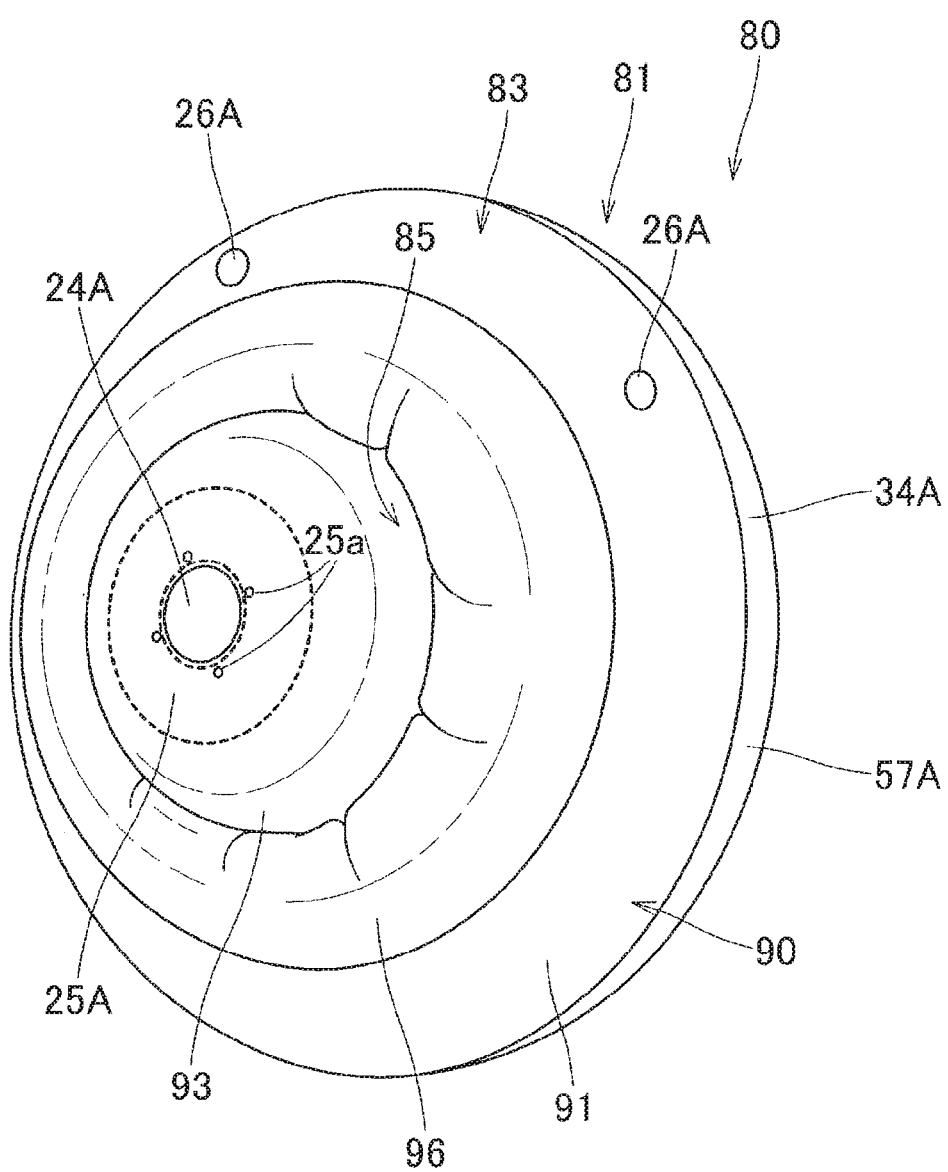
FIG. 11 is a perspective view of a single inflated airbag in accordance with a second illustrative embodiment of the present invention, as seen from below.

Also, as shown in FIGS. 5 and 6, the vehicle body-side wall part 23 of the bag main body 21 is formed with a concave part 28 that is concave upward toward the driver-side wall part 34 side upon completion of the inflation. As shown in FIGS. 9 and 10, the concave part 28 is configured so that, when the airbag 20 receives the driver MD upon completion of the inflation, a rear part-side region Rb of the ring part R is allowed to enter into a rear region 28c, and in the illustrative embodiment, has a substantially circular arc shape substantially along the ring part R, when the airbag 20 (bag main body 21) upon completion of the inflation is seen in the upper and lower direction. Specifically, as shown in FIG. 4, the concave part 28 has a substantially circular ring shape, which is substantially concentric with the outer peripheral edge of the bag main body 21 (spaced distances from the center (mounting center C1) of the inlet opening 24 are equal), in a region between the inlet opening 24 and the vent holes 26, when the airbag 20 (bag main body 21) upon completion of the inflation is seen in the upper and lower direction. As shown in FIGS. 4 and 9, the concave part 28 is configured so that the rear region 28c is to be arranged in the vicinity of the rear part-side region Rb of the ring part R upon completion of the inflation of the bag main body 21, and is also configured so that the rear part-side region Rb of the ring part R is allowed to enter into the concave part when the airbag 20 upon completion of the inflation receives the driver MD. Also, the concave part 28 is configured so that, when the rear part-side region Rb of the ring part R is entered into the concave part, the driver-side wall part 34 is arranged substantially along the vertical direction. That is, the concave part 28 has a depth (depression amount) T1 (refer to FIG. 5) having a dimension set so that when the ring part R (rear part-side region Rb) is allowed to enter into the rear region 28c, the bag main body 21 is entirely inclined relative to a ring surface RF of the steering wheel W so that a rear end (rear part-side region 21b) faces downward, and the driver-side wall part 34 is thus inclined relative to the ring surface RF and can be arranged substantially along the vertical direction.

Specifically, a leading end 28a of the depression is coupled to the driver-side wall part 34 by the tethers 40 arranged in the bag main body 21, so that a shape of the depression of the concave part 28 is restrained. In the illustrative embodiment, the concave part 28 has an inner wall part 30 arranged at the center side (the inlet opening 24 side) and an outer wall part 29 arranged at an outer side (a side distant from the inlet opening 24), and is slightly inclined relative to a central line CL1 so that upon completion of the inflation of the bag main body 21, the leading end (bottom part) 28a of the depression faces toward the central line CL1 side (center side) passing the center (mounting center C1) of the inlet opening 24 and extending in the upper and lower direction (refer to FIGS. 5, 6 and 9). Also, the concave part 28 has an inner diameter dimension d1 (refer to FIG. 4) set to be smaller than a ring diameter D1 (refer to FIG. 1) of the steering wheel W when the airbag 20 (bag main body 21) upon completion of the inflation is seen in the upper and lower direction, and is configured so that the rear region 28c is arranged in the vicinity of the rear part-side region Rb of the ring part R upon completion of the inflation of the bag main body 21 (refer to FIGS. 4 and 9). In the illustrative embodiment, the airbag 20 is mounted to the steering wheel W in the state where the mounting center C1 slightly deviates rearward with respect to the center C2 of the ring part R (the rotation center of the steering wheel W), and the concave part 28 arranged so that the center coincides with the mounting center C1 is also arranged at the position at which the center thereof deviates rearward with respect to the center C2 of the ring part R. That is, as shown in FIGS. 4 and 9, upon completion of the inflation of the bag main body 21, a front region 28b of the concave part 28 is arranged at a position distant rearward from the ring part R. For this reason, when receiving the driver MD by the airbag 20 upon completion of the inflation, it is possible to suppress a front part-side region of the ring part R from moving into the front region 28b of the concave part 28.

As shown in FIGS. 5 and 6, the flow regulating cloth 37 arranged in the bag main body 21 is arranged to cover the upper side of the inlet opening 24 upon completion of the inflation of the bag main body 21, and has a substantial tube shape of which both ends in the front and rear direction are opened so that the inflation gas G introduced from the inlet opening 24 can be flow-regulated in the front and rear direction. In the illustrative embodiment, the flow regulating cloth 37 is composed of a material 60 for flow regulating cloth shown in FIG. 8. The material 60 for flow regulating cloth has a central part 60a and a left part 60b and a right part 60c each of which has a substantial fan shape protruding in the left and right direction from the central part 60a. The central part 60a is joined (sewn) to the peripheral edge (mounting part 25) of the inlet opening 24, and the left part 60b and the right part 60c are sewn (joined) to each other at outer peripheral edges thereof, so that the flow regulating cloth 37 having openings 37a, 37b formed at front and rear sides is configured.

The tethers 40 arranged in the bag main body 21 are arranged at a plurality of places around the inlet opening 24 so as to couple the leading end 28a of the depression of the concave part 28 and a region in the vicinity of the center of the driver-side wall part 34. In the illustrative embodiment, specifically, the plurality of (six, in the illustrative embodiment) tethers 40 is arranged in a radial manner so as to pull the concave part 28 upward (toward the driver-side wall part 34) substantially equally over the entire circumference in a region except the openings 37a, 37b of the flow regulating cloth 37, i.e., in a region except the front or rear of the flow regulating cloth 37 around the inlet opening 24, when the airbag 20 upon completion of the inflation is seen in the upper and lower direction (refer to FIGS. 5 and 6). In other words, the respective tethers 40 are arranged in a radial manner with deviating from each other by about 60° in a region except the front and rear sides at which the openings 37a, 37b of the flow regulating cloth 37 are arranged (in a region where it is possible to avoid interference with the inflation gas to flow out from the openings 37a, 37b of the flow regulating cloth 37 in the front and rear direction) (refer to FIG. 8). In other words, the respective tethers 40 are arranged in a region that does not face a main flow of the inflation gas to flow in a substantially linear aspect from the vicinities of centers of the openings 37a, 37b of the flow regulating cloth 37 in the front and rear direction. Each of the tethers 40 is formed by joining (sewing) an upper region 41 arranged at the driver-side wall part 34 side and a lower region 42 arranged at the vehicle body-side wall part 23 side (the concave part 28 side). In the illustrative embodiment, as shown in FIGS. 5 and 6, the tether 40 has such a configuration that an upper joining region 45 of an upper end 40a side joined to the driver-side wall part 34 side is located at a position closer to a center than a lower joining region 46 of a lower end 40b side joined to the leading end 28a side of the depression of the concave part 28 in the airbag 20 upon completion of the inflation, and is expanded downward (toward the vehicle body-side wall part 23 side). That is, in the illustrative embodiment, the upper joining region 45 for joining the upper end 40a side of the tether 40 to the driver-side wall part 34 side is configured so that a spaced distance T2 from the central line CL1 passing the center (mounting center C1) of the inlet opening 24 and extending substantially in the upper and lower direction is smaller than a spaced distance T3 from the central line CL1 of the lower joining region 46 for joining the lower end 40b side of the tether 40 to the leading end 28a side of the concave part 28 upon completion of the inflation of the airbag 20 (refer to FIG. 5), and each tether 40 is arranged with being inclined relative to the central line CL1. Also, a length dimension of the tether 40 (a spaced distance T4 between the lower joining region 46 and the upper joining region 45 in the airbag 20 upon completion of the inflation) is set so that the smooth deployment and inflation of the airbag 20 is not disturbed and a region of the concave part 28 is not loosened and the leading end 28a of the concave part 28 can be pulled toward the driver-side wall part 34 upon completion of the inflation of the airbag 20 (bag main body 21). Also, the length dimension of the tether 40 is set so that upon completion of the inflation of the airbag 20, while the ring part R is allowed to enter into the concave part 28, when an abdominal region of the driver MD is received by the rear part-side region 21b, the bottoming is suppressed to correctly protect the abdominal region of the driver MD.

Figure 8:
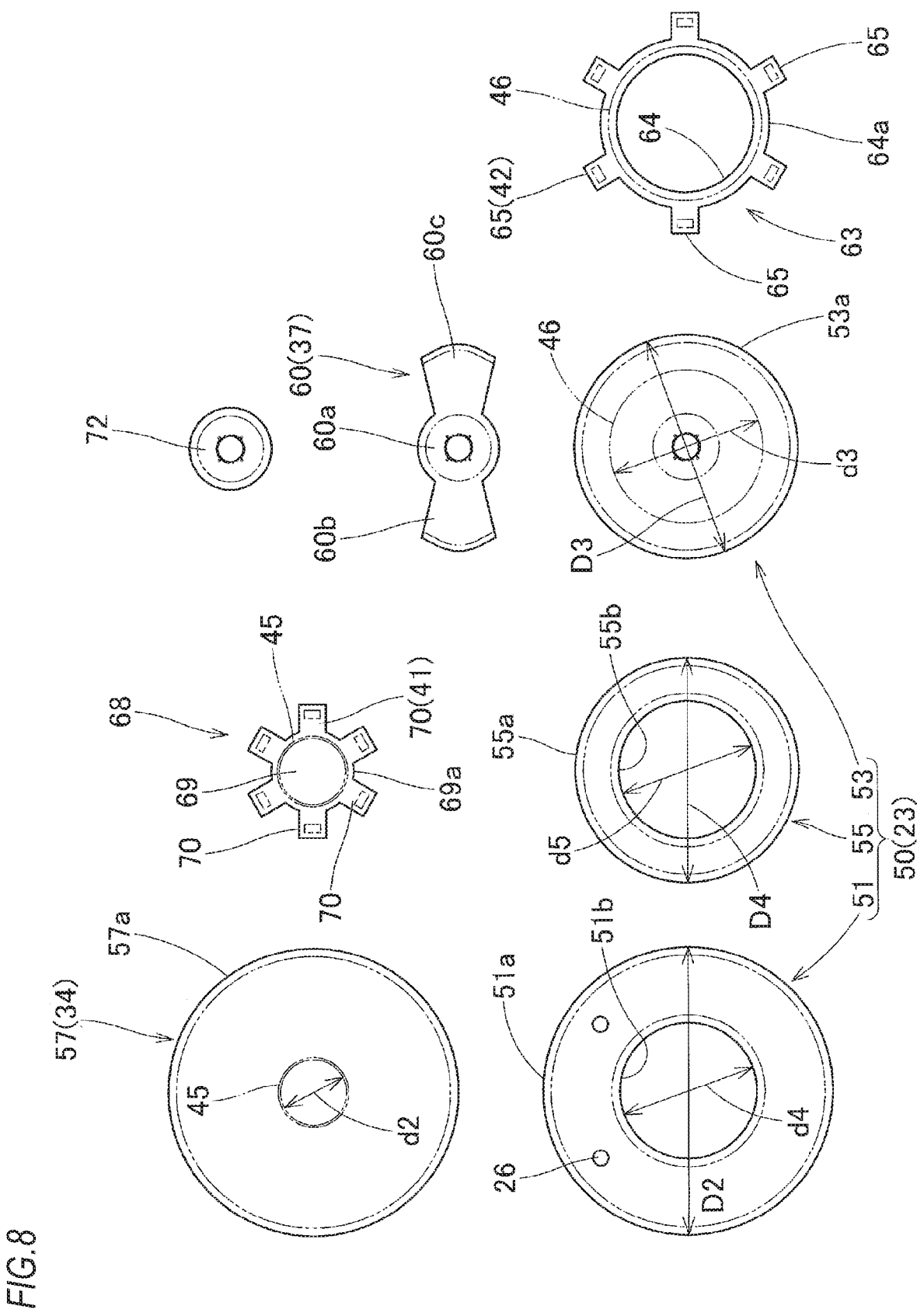
FIG. 8 is a plan view of base fabrics configuring the airbag of FIG. 3.

In the illustrative embodiment, the tether 40 is configured by two base fabrics 63, 68 for tether as shown in FIG. 8. The base fabric 63 for tether that is arranged at the vehicle body-side wall part 23 side (the concave part 28 side) has a substantially circular ring-shaped mounting base part 64 and six main body parts 65 having a substantially band-shaped outer shape, protruding radially outward from an outer peripheral edge 64a of the mounting base part 64 and configuring the lower region 42. The mounting base part 64 is sewn (joined) over an entire circumference to a central panel part 53 (which will be described later) configuring the vehicle body-side wall part 23 by using a stitching thread, so that the base fabric 63 for tether is joined to the leading end 28a of the depression of the concave part 28. The base fabric 68 for tether that is arranged at the driver-side wall part 34 side has a substantially circular mounting base part 69 and six main body parts 70 having a substantially band-shaped outer shape, protruding radially outward from an outer peripheral edge 69a of the mounting base part 69 and configuring the upper region 41. The mounting base part 69 is sewn (joined) over an entire circumference to a driver-side panel 57 (which will be described later) configuring the driver-side wall part 34 in the vicinity of the outer peripheral edge 69a by using a stitching thread, so that the base fabric 68 for tether is joined to the driver-side wall part 34. The lower joining region 46 joining the mounting base part 64 of the base fabric 63 for tether to the central panel part 53 and the upper joining region 45 joining the mounting base part 69 of the base fabric 68 for tether to the driver-side panel 57 have a substantially circular shape of which a center coincides with a center (mounting center C1) of each of the central panel part 53 and the driver-side panel 57, respectively, and an inner diameter dimension d2 of the upper joining region 45 is set to be smaller than an inner diameter dimension d3 of the lower joining region 46 (refer to FIG. 8). In the illustrative embodiment, the inner diameter dimension d2 of the upper joining region 45 is set to about 4/9 of the inner diameter dimension d3 of the lower joining region 46. That is, in the illustrative embodiment, the inner diameter dimensions d2, d3 of the upper joining region 45 and the lower joining region 46 having the substantially circular shapes of which the centers substantially coincide with the mounting center C1 are made to be different from each other, so that the spaced distances T2, T3 of the upper joining region 45 and the lower joining region 46 of each tether 40 from the central line CL1 are different from each other. Each tether 40 is arranged with being inclined relative to the central line CL1 so that the lower end 40b side is to be expanded. Thereby, the concave part 28 that is to be pulled by the tethers 40 is arranged with being inclined relative to the central line CL1 so that the leading end 28a of the depression faces toward the central line CL1.

In the illustrative embodiment, the bag main body 21 is configured by a driver-side panel 57 configuring the driver-side wall part 34 and a vehicle body-side panel 50 configuring the vehicle body-side wall part 23. The driver-side panel 57 has a substantial flat plate shape.

Figure 7:
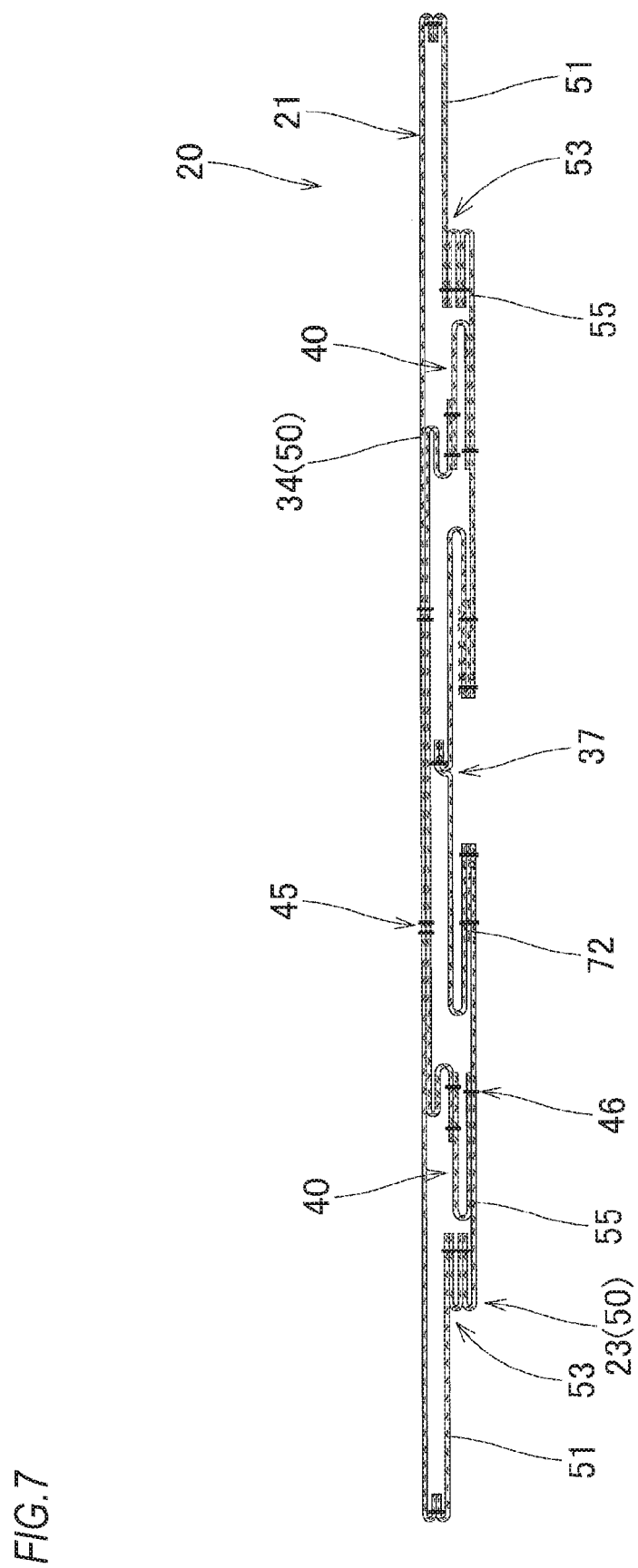
FIG. 7 is a sectional view of the airbag of FIG. 3 in a flatly deployed state.

The vehicle body-side panel 50 has a substantially circular ring-shaped outer panel part 51 of which an outer diameter dimension D2 (refer to FIG. 8) is made to be substantially the same as the driver-side panel 57, a central panel part 53 having a substantially circular shape and a substantially circular ring-shaped intermediate panel part 55 arranged between the outer panel part 51 and the central panel part 53. The outer panel part 51 configures a region of the outer peripheral edge 23a side of the vehicle body-side wall part 23, and an outer peripheral edge 51a is joined to an outer peripheral edge 57a of the driver-side panel 57. Also, in the illustrative embodiment, the vent holes 26, 26 are formed in a region of the outer panel part 51. The central panel part 53 configures a center-side region of the vehicle body-side wall part 23, has the inlet opening 24, and has an outer diameter dimension D3 set to be greater than an inner diameter dimension d4 of the opening region of the outer panel part 51 (refer to FIG. 8). In the illustrative embodiment, the outer diameter dimension D3 of the central panel part 53 is set to about 7/9 of the outer diameter dimension D2 of the outer panel part 51 and to about 7/4 of the inner diameter dimension d4 of the outer panel part 51. The central panel part 53 is joined in the lower joining region 46 with the mounting base part 64 of the base fabric 63 for tether, and the inner diameter dimension d3 of the lower joining region 46 is set to about 5/7 of the outer diameter dimension D3 of the central panel part 53 (to about 5/9 of the outer diameter dimension D2 of the outer panel part 51). A region of the central panel part 53 around the lower joining region 46 (an inner periphery-side region and an outer periphery-side region of the lower joining region 46) is pulled to the upper side, which is the driver-side wall part 34 side, by the tether 40 upon completion of the inflation of the bag main body 21, thereby forming the concave part 28. The intermediate panel part 55 has such a configuration that an outer diameter dimension D4 (refer to FIG. 8) is substantially the same as the outer diameter dimension D3 of the central panel part 53, an inner diameter dimension d5 of an opening region is substantially the same as the inner diameter dimension d4 of the opening region of the outer panel part 51, an outer peripheral edge 55a is joined to an outer peripheral edge 53a of the central panel part 53, and an inner peripheral edge 55b is joined to an inner peripheral edge 51b of the outer panel part 51. In the illustrative embodiment, the intermediate panel part 55 is arranged to be folded between the central panel part 53 and the outer panel part 51 in a state where the bag main body 21 is flatly deployed, as shown in FIG. 7. Upon completion of the inflation of the bag main body 21, a region of the central panel part 53 around the lower joining region 46 is pulled by the tethers 40 and forms the concave part 28, so that the intermediate panel part 55 is pulled out and arranged to continue from the outer panel part 51 and configures the vehicle body-side wall part 23 (refer to FIGS. 5, 6 and 9). Also, in the illustrative embodiment, the vehicle body-side panel 50 includes a reinforcement cloth 72 having a substantially circular shape and provided to reinforce the mounting part 25 of the peripheral edge of the inlet opening 24 (refer to FIGS. 5, 6 and 8).

In the illustrative embodiment, the driver-side panel 57 and the vehicle body-side panel 50 (the outer panel part 51, the central panel part 53 and the intermediate panel part 55) configuring the bag main body 21, the reinforcement cloth 72, the material 60 for flow regulating cloth configuring the flow regulating cloth 37, and the base fabrics 63, 68 for tether configuring the tether 40 are respectively made of a woven fabric having flexibility and composed of polyester yarn, polyamide yarn or the like. Specifically, the airbag 20 of the illustrative embodiment is mounted to the steering wheel W of which the ring diameter D1 is set to about 370 mm, an outer diameter dimension D5 (refer to FIG. 4) of the bag main body 21 upon completion of the inflation is set to about 590 mm, and the inner diameter dimension d1 of the concave part 28 of the bag main body 21 is set to about 250 mm. Also, the depth T1 of the depression of the concave part 28 is set to about 80 mm in the bag main body 21 upon completion of the inflation.

Subsequently, a manufacturing method of the airbag 20 of the illustrative embodiment is described. The reinforcement cloth 72 and the material 60 for flow regulating cloth are overlapped on the inner peripheral surface side of the central panel part 53 and are sewn in a region becoming the peripheral edge of the inlet opening 24 by using a stitching thread, and the inlet opening 24 and the mounting hole 25a are formed by hole drilling processing. Also, the mounting base part 64 of the base fabric 63 for tether is overlapped on the inner peripheral surface side of the central panel part 53, and the mounting base part 64 is sewn to form the lower joining region 46 by using the stitching thread. Then, the central panel part 53 and the intermediate panel part 55 are overlapped with the outer peripheral surfaces facing each other so that the outer peripheral edges 53a, 55a coincide with each other, and the outer peripheral edges 53a, 55a are sewn each other using the stitching thread. Thereafter, the intermediate panel part 55 and the outer panel part 51 are overlapped with the outer peripheral surfaces facing each other, and the inner peripheral edges 51b, 55b are sewn each other using the stitching thread, so that the vehicle body-side panel 50 is formed. At this time, the vehicle body-side wall part 23 having the concave part 28 is formed. The driver-side panel 57 is overlapped in advance on the inner peripheral surface side with the mounting base part 69 of the base fabric 68 for tether, and the mounting base part 69 is sewn to form the upper joining region 45 by using the stitching thread. Then, the driver-side panel 57 and the vehicle body-side panel 50 are overlapped with the outer peripheral surfaces facing each other so that the outer peripheral edge 51a of the outer panel part 51 and the outer peripheral edge 57a of the driver-side panel 57 coincide with each other, and the outer peripheral edges 51a, 57a are sewn each other using the stitching thread, so that the bag main body 21 is formed. Thereafter, the bag main body 21 is reversed using the inlet opening 24 so that the seam is not exposed to the outside, the respective main body parts 65, 70 of the base fabrics 63, 68 for tether, 68 are sewn using the stitching thread to form the tethers 40, and the outer peripheral edges of the left region 60b and the right region 60c of the material 60 for flow regulating cloth are sewn to form the flow regulating cloth 37, so that the airbag 20 is manufactured.

After manufacturing the airbag 20, in a state where the retainer 10 is arranged in the airbag with the bolts protruding from the respective mounting holes 25a, the airbag 20 is folded to be accommodated in the case 12. Then, the folded airbag 20 is accommodated in the case 12, the main body part 11a of the inflator 11 is inserted from below, and the inflator 11 and the airbag 20 are mounted to the case 12 by using the bolts protruding from the bottom wall part 12a and the nuts. Also, the case 12 is covered with the airbag cover 14 and the airbag cover 14 is mounted to the case 12 by using the rivet 15 or the like. Thereafter, when the horn switch mechanism (not shown) is mounted to the mounting piece 12c of the case 12, the airbag device M can be assembled. When the airbag device M is mounted to the steering wheel main body 1 fastened in advance to the steering shaft SS by using the mounting substrate (not shown) of the horn switch mechanism, the airbag device can be mounted to the vehicle V.

In the airbag device M of the illustrative embodiment, when the inflation gas is discharged from the gas discharge ports 11b of the inflator 11, the airbag 20 (bag main body 21) is inflated as the inflation gas is introduced therein, pushes and opens the door parts 14b, 14b of the airbag cover 14, protrudes from the case 12, and completes the inflation thereof with covering the upper surface of the steering wheel W over the substantially entire surface, as shown in FIG. 9.

In the airbag 20 that is used for the airbag device M of the first illustrative embodiment, the concave part 28 into which the ring part R of the steering wheel W is allowed to enter upon completion of the inflation is formed to be concave upward toward the driver-side wall part 34 at the vehicle body-side wall part 23. That is, in the airbag 20 of the illustrative embodiment, the concave part 28 is not a partially protruding region, like the airbag for steering wheel of the related art, and is formed by recessing the airbag 20 (bag main body 21) itself, so that it is possible to suppress an increase in volume. Also, in the airbag 20 of the illustrative embodiment, upon completion of the inflation of the airbag 20, when the driver MD is moved forward and is contacted to the rear part-side region 21b of the airbag 20 (bag main body 21) having inflated to cover the steering wheel W, the rear part-side region 21b of the airbag 20 (bag main body 21) is moved forward to make the rear part-side region Rb of the ring part R enter into the rear region 28c of the concave part 28. Accordingly, it is possible to stabilize the arrangement position of the airbag 20 relative to the steering wheel W (ring part R), and to stably receive the driver MD moving forward by the airbag 20 arranged to cover the ring part R. Also, in the airbag 20 of the illustrative embodiment, the rear part-side region 21b of the airbag 20 (bag main body 21) is pushed by the driver MD moving forward and is moved forward to make the ring part R enter into the concave part 28. Accordingly, it is possible to suppress the rear part-side region 21b from pressing a chest BA of the driver MD.

Therefore, according to the airbag 20 of the first illustrative embodiment, it is possible to smoothly protect the driver MD with the simple configuration.

Also, in the airbag 20 of the first illustrative embodiment, the concave part 28 is arranged at the driver-side wall part 34 substantially along the vertical direction when the driver MD is received by the airbag 20 upon completion of the inflation. In other words, in the airbag of the illustrative embodiment, as the rear part-side region 21*b* of the airbag 20 (bag main body 21) is moved forward, the front part-side region 21*a* of the airbag 20 (bag main body 21) arranged with the inlet opening 24 being interposed with respect to the rear part-side region 21*b* is arranged to float above the steering wheel W, so that the driver-side wall part 34 is arranged substantially along the vertical direction (refer to FIG. 10). For this reason, in the airbag 20 of the illustrative embodiment, upon completion of the inflation, when the driver MD is moved forward, it is possible to suppress the rear part-side region 21*b* from pressing the chest BA of the driver MD, to receive an upper body UB of the driver MD over a wide range by the driver-side wall part 34 arranged substantially along the vertical direction UD so as to substantially face the upper body UB of the driver MD, and to softly receive a head H of the driver MD by the front part-side region 21*a* of the bag main body 21 to inflate in a relatively thick aspect in a gap provided between the head and the ring part R.

Also, in the airbag 20 of the first illustrative embodiment, since the concave part 28 has a substantially circular arc shape substantially along the ring part R, when the airbag 20 upon completion of the inflation is seen in the upper and lower direction, it is possible to make the circular ring-shaped ring part R smoothly enter into the concave part 28. Particularly, in the airbag 20 of the first illustrative embodiment, the concave part 28 has a substantially circular ring shape, when the airbag 20 upon completion of the inflation is seen in the upper and lower direction. Therefore, even during an operation in a state where the steering wheel W is rotated upon the steering, it is possible to easily make the ring part R enter into the concave part 28. On the other hand, if the above points are not considered, the concave part may be formed to have a substantially circular arc shape, instead of the circular ring shape, and may also be formed to have a linear or curved shape when the airbag upon completion of the inflation is seen in the upper and lower direction, instead of the circular arc shape, if the ring part can be easily entered into the concave part. When the concave part is formed to have a circular arc shape, the concave part is preferably configured to have about 1/3 circular arc length or longer so that the ring part can be smoothly entered into the concave part.

Furthermore, in the illustrative embodiment, the airbag 20 has the tethers 40 arranged in the bag main body 21 and configured to couple the leading end 28*a* of the depression of the concave part 28 to the driver-side wall part 34, the tethers 40 are arranged at the multiple places around the inlet opening 24 and are respectively configured so that the spaced distance T2 of the region (upper joining region 45) joined to the driver-side wall part 34 from the central line CL1 passing the center (mounting center C1) of the inlet opening 24 and extending substantially in the upper and lower direction is smaller than the spaced distance T3 of the region (lower joining region 46) joined to the leading end 28*a* of the depression of the concave part 28 from the central line CL1. For this reason, the tethers 40 are arranged in the airbag 20 of the illustrative embodiment, so that the upon completion of the inflation of bag main body 21, the concave part 28 can be securely arranged in a concave shape and the concave part 28 is pulled by the tethers 40, so that the leading end 28*a* of the depression is arranged with being inclined toward the central line CL1 passing the center (mounting center C1) of the inlet opening 24 (refer to FIG. 9). For this reason, the outer wall part 29 that is arranged at an outer side of the concave part 28 distant from the inlet opening 24 becomes a guide surface, so that when making the ring part R enter into the concave part, it is possible to make the ring part R further smoothly enter into the concave part 28. In other words, the ring part R is made to slide to the outer wall part 29, and the airbag 20 can be easily moved relative to the ring part R so that the rear part-side region 21*b* of the bag main body 21 is to move downward. As a result, it is possible to arrange the driver-side wall part 34 substantially along the vertical direction. Also, in the airbag 20 of the illustrative embodiment, the concave part 28 is arranged so that the leading end 28*a* faces toward the central line CL1. Thereby, during the entering of the ring part R into the concave part 28 upon the receiving of the driver MD, when the ring part R is entered up to the vicinity of the leading end of the concave part 28, the driver-side wall part 34 is pulled downward, and even when the concave part 28 is arranged in the substantially circular ring shape, it is possible to suppress the ring part R from moving into the front region 28*b* of the concave part 28 arranged to face the rear region 28*c* into which the ring part R is entered. On the other hand, if the above points are not considered, the tether for coupling the leading end of the depression of the concave part to the driver-side wall part may not be arranged in the bag main body. Also, even when the tether is arranged, the spaced distances from the central lines of the upper joining region and the lower joining region may be made to be substantially the same or the tether may be arranged with the spaced distance of the upper joining region from the central line being set to be greater than the spaced distance of the lower joining region from the central line.

Also, in the airbag 20 of the first illustrative embodiment, the vehicle body-side panel 50 configuring the vehicle body-side wall part 23 is configured by the three parts of the outer panel part 51, the central panel part 53 and the intermediate panel part 55 and is formed by sewing the outer peripheral edges 53*a*, 55*a* and the inner peripheral edges 51*b*, 55*b*. Specifically, the intermediate panel part 55 arranged between the outer panel part 51 and the central panel part 53 has a substantially circular ring shape of which the outer diameter dimension D4 is made to substantially coincide with the outer diameter dimension D3 of the central panel part 53 and the inner diameter dimension d5 of the opening region is made to substantially coincide with the inner diameter dimension d4 of the opening region of the outer panel part 51. For this reason, during the manufacturing of the bag main body 21, when the intermediate panel part 55 deployed in the flat aspect is overlapped with the outer panel part 51 or the central panel part 53 deployed in the flat aspect, it is possible to join (sew) the corresponding edge portions each other and to form the vehicle body-side wall part 23 having the concave part 28 by the two-dimensional sewing operation. Therefore, it is possible to form the airbag 20 having the concave part 28 by the two-dimensional joining operation, so that it is possible to simply perform the manufacturing operation. On the other hand, if the above points are not considered, an airbag 80 that is to be manufactured by a three-dimensional sewing (joining) operation may be used, like an airbag 80 that is to be described later.

Furthermore, in the airbag 20 of the first illustrative embodiment, the flow regulating cloth 37 configured to cover the upper side of the inlet opening 24 and capable of regulating the flow of the inflation gas introduced into the bag main body 21 in the front and rear direction is arranged in the bag main body 21. Therefore, at an early stage of the inflation of the airbag 20, the inflation gas introduced into the bag main body 21 flows toward both the front and rear sides via the flow regulating cloth 37 and can widely deploy the bag main body 21 in the front and rear direction, so that even when the gap between the abdominal region (chest BA) of the driver MD and the ring part R is narrow, it is possible to make the bag main body 21 rapidly enter into the narrow gap. Also, in the airbag 20 of the illustrative embodiment, the tethers 40 are arranged in the radial manner in the region except the openings 37a, 37b of the flow regulating cloth 37 when the airbag 20 upon completion of the inflation is seen in the upper and lower direction. For this reason, it is possible to suppress the inflation gas flowing from the opening region of the flow regulating cloth 37 from being influenced by the tethers 40, and to stabilize the depression shape of the concave part 28 over a wide range by the tethers 40. Particularly, in the airbag 20 of the illustrative embodiment, since the tethers 40 are arranged at the six radial places about the center (mounting center C1) of the inlet opening 24, it is possible to stably recess the concave part 28, which is formed to have a substantially circular ring shape when the airbag 20 upon completion of the inflation is seen in the upper and lower direction, over the substantially entire circumference. In the meantime, the number of tethers 40 is not limited to six and may be smaller than six. In order to stabilize the depression shape of the substantially circular ring-shaped concave part over the substantially entire range, the tethers are preferably arranged at four or more radial places.

Subsequently, an airbag 80 in accordance with a second illustrative embodiment of the present invention is described. The airbag 80 has the same configuration as the airbag 20, except a shape of a concave part 85 that is arranged at a vehicle body-side wall part 83 side of a bag main body 81 and a configuration of a vehicle body-side panel 90 configuring the vehicle body-side wall part 83. Therefore, the same members are denoted with the same reference numerals having "A" annexed thereto, and the detailed descriptions thereof are omitted.

As shown in FIGS. 11 to 14, the airbag 80 has a bag main body 81, a flow regulating cloth 37A arranged in the bag main body 81, and tethers 40A arranged in the bag main body 81, like the airbag 20.

The bag main body 81 is mounted to the steering wheel W in a state where a mounting center C3 slightly deviates rearward with respect to the rotation center C2 of the steering wheel W, and is configured to cover the upper surface of the ring part R over a substantially entire surface upon completion of the inflation (refer to FIG. 12), like the bag main body 21.

Figure 12:
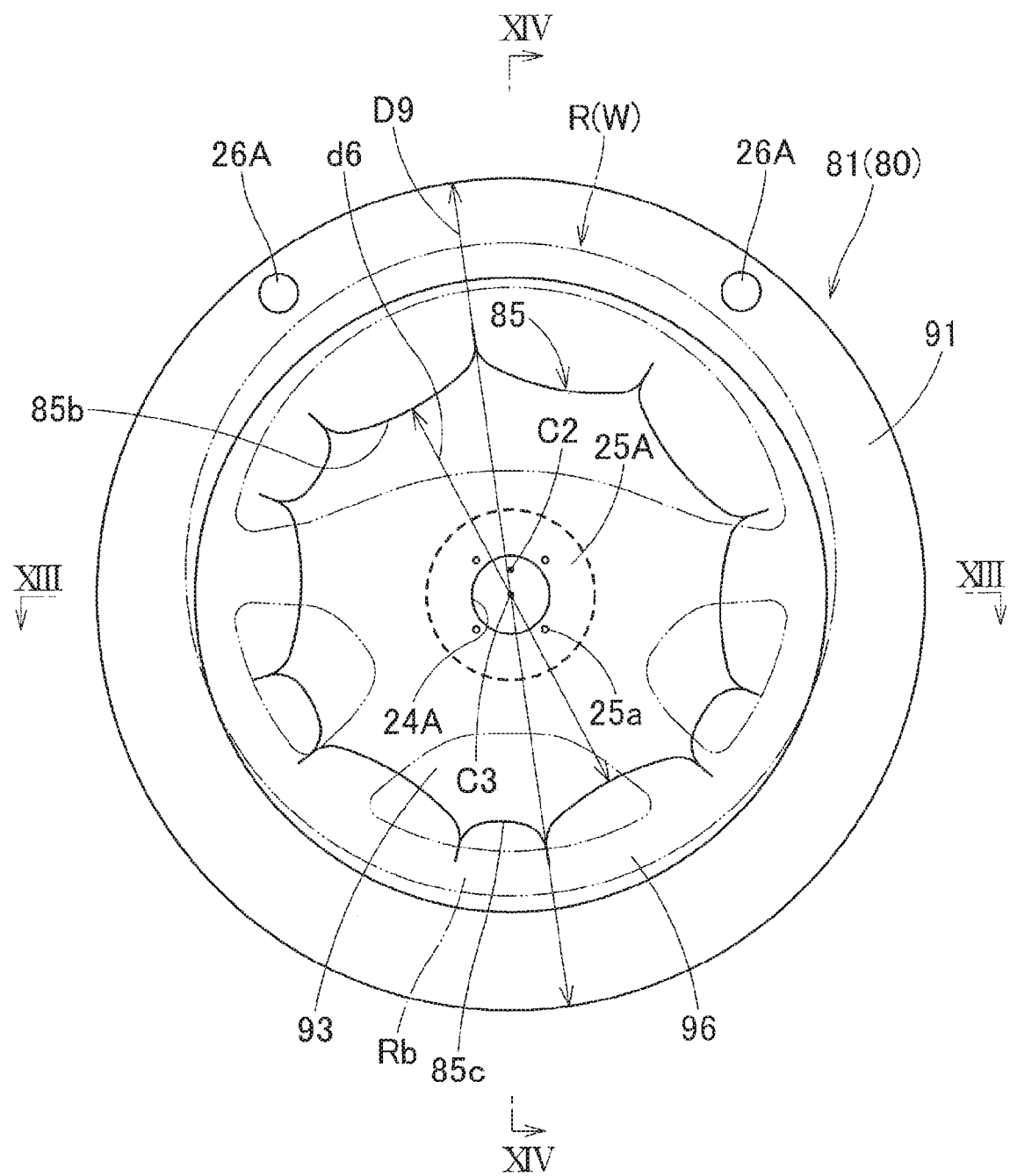
FIG. 12 is a bottom view of the single inflated airbag of FIG. 11.
Figure 13:
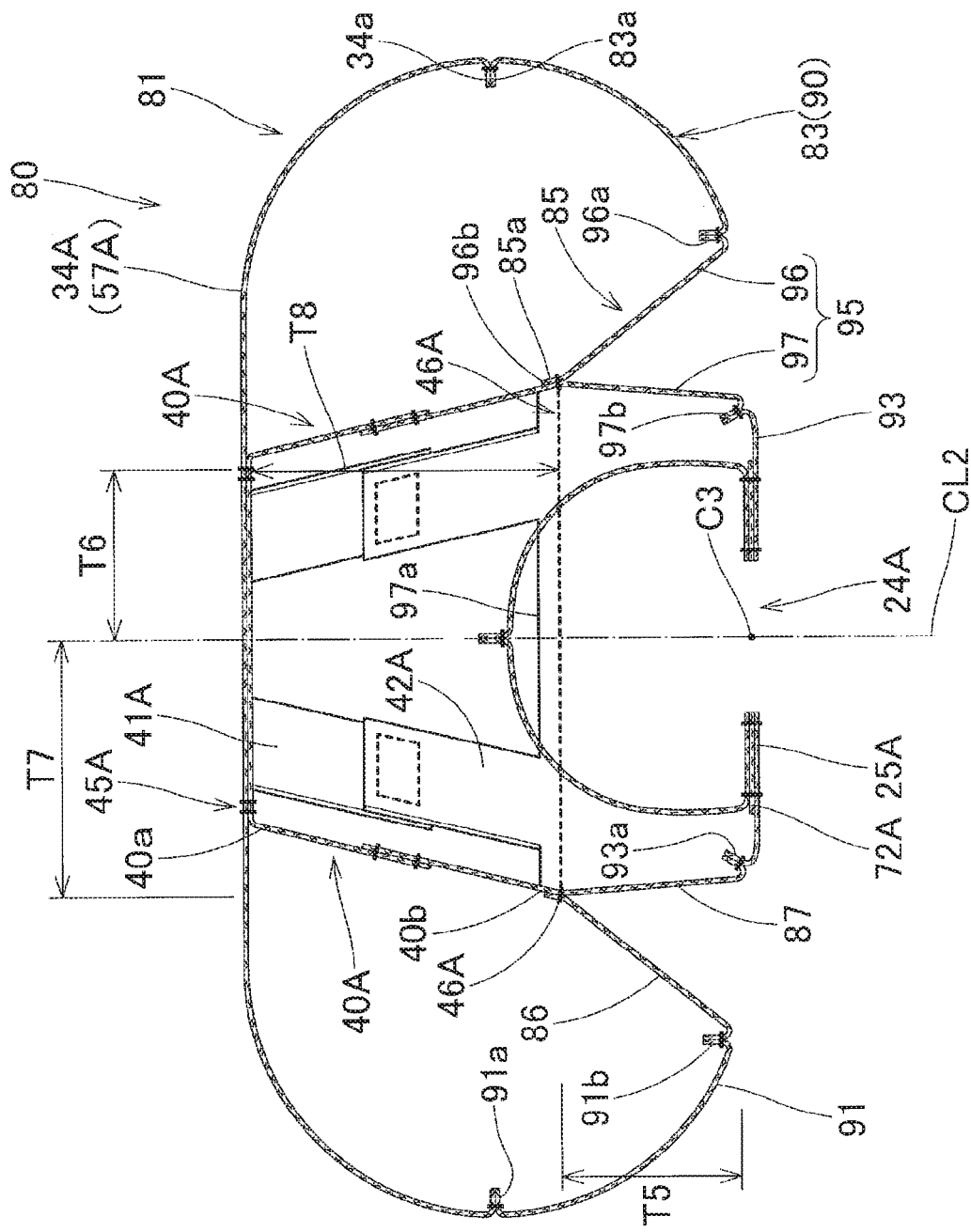
FIG. 13 is a sectional view taken along a line XIII-XIII of FIG. 12.
Figure 14:
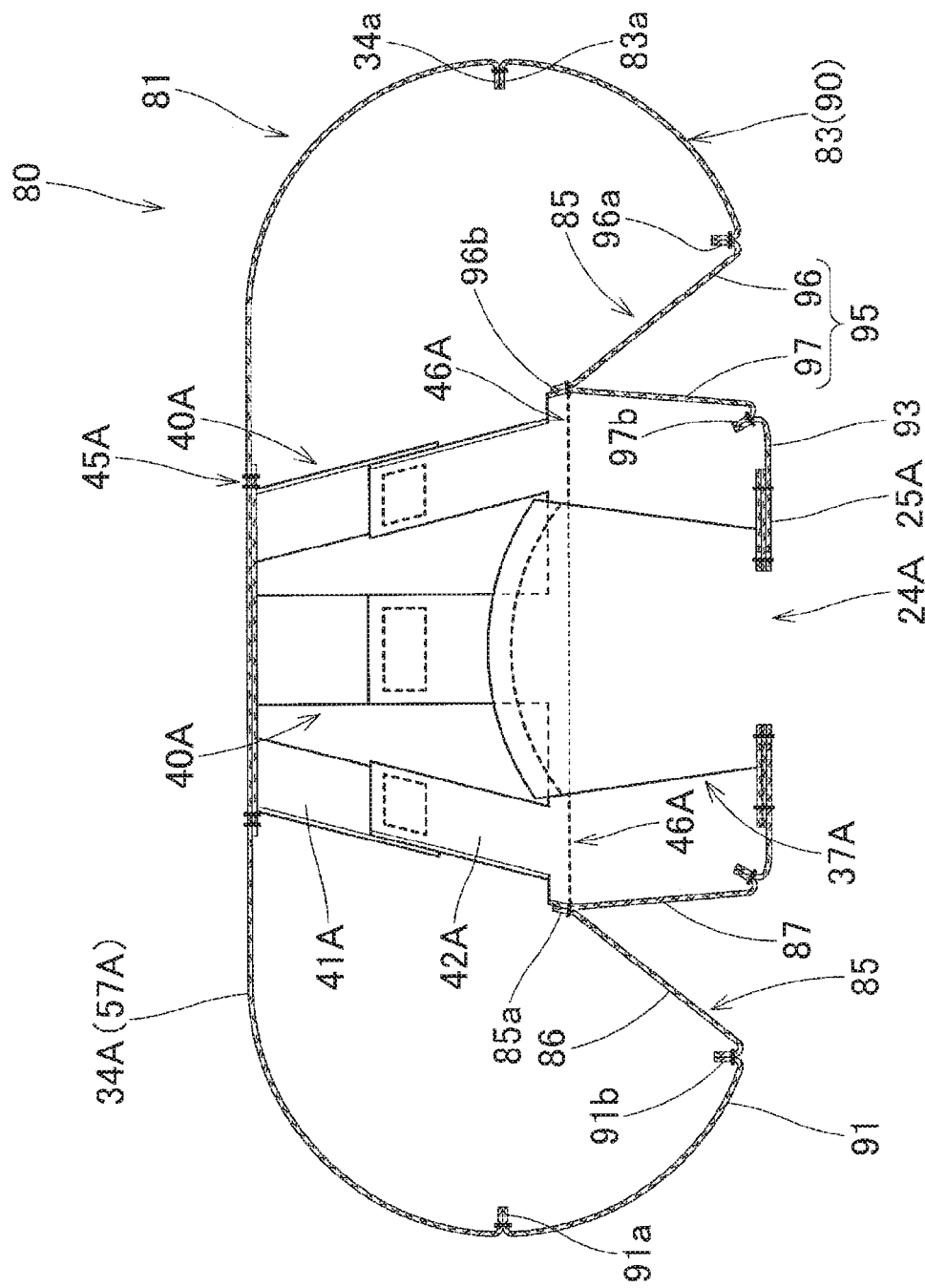
FIG. 14 is a sectional view taken along a line XIV-XIV of FIG. 12.
Figure 16:
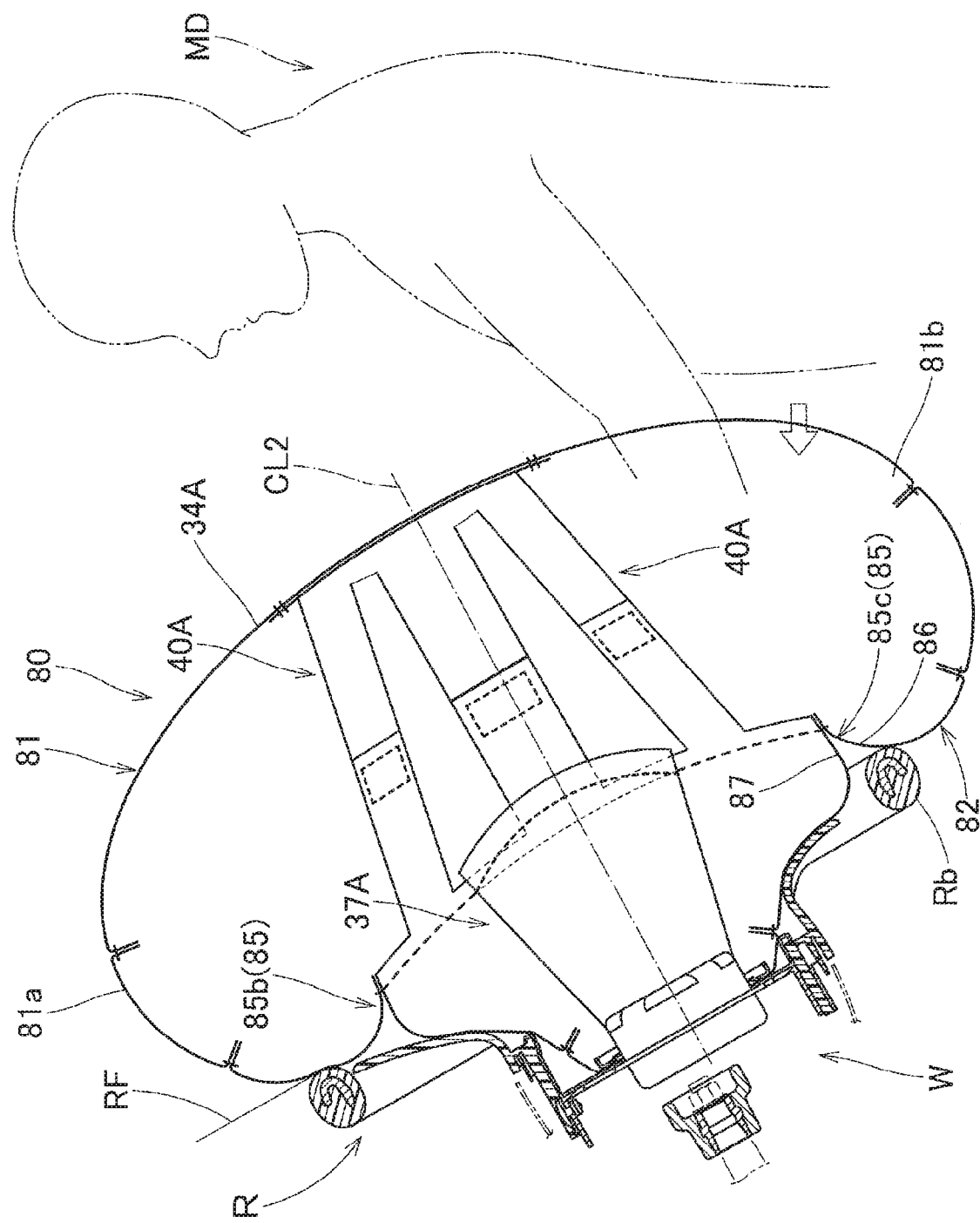
FIG. 16 is a schematic longitudinal sectional view depicting a state where inflation of the airbag has completed in the airbag device for steering wheel, in which the airbag of the second illustrative embodiment is used.
Figure 17:
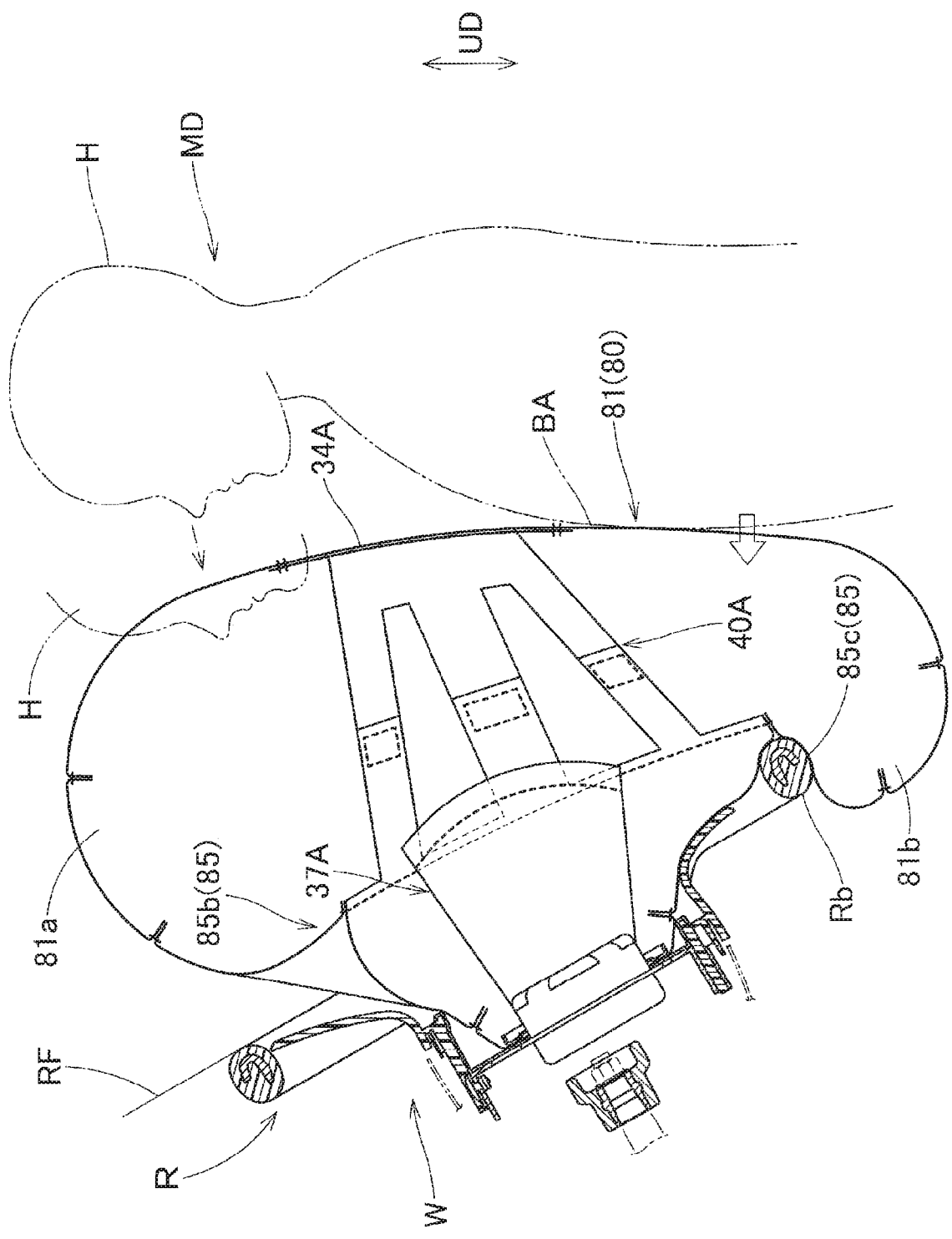
FIG. 17 is a schematic longitudinal sectional view depicting a state where the airbag after completion of the inflation in the airbag device for steering wheel, in which the airbag of the second illustrative embodiment is used, has received a driver moving forward.

Also in the airbag 80 of the second illustrative embodiment, the vehicle body-side wall part 83 of the bag main body 81 is formed with a concave part 85 that is concave upward toward the driver-side wall part 34A upon completion of the inflation. As shown in FIGS. 16 and 17, the concave part 85 is configured so that the rear part-side region Rb of the ring part R is to enter into a rear region 85c when the driver MD is received by the airbag 80 upon completion of the inflation, and has a substantially circular ring shape, which is substantially concentric with an outer peripheral edge of the bag main body 81 (spaced distances from the center (mounting center C3) of the inlet opening 24A are equal), when the airbag 80 (bag main body 81) upon completion of the inflation is seen in the upper and lower direction (refer to FIGS. 11 and 12), like the airbag 20. That is, the concave part 85 has also a substantially circular arc shape substantially along the ring part R, when the airbag 80 (bag main body 81) upon completion of the inflation is seen in the upper and lower direction. As shown in FIGS. 12 and 16, upon completion of the inflation of the bag main body 81, the rear region 85c is arranged in the vicinity of the rear part-side region Rb of the ring part R, so that when the driver MD is received by the airbag 80 upon completion of the inflation, the rear part-side region Rb of the ring part R is entered into the concave part 85, as shown in FIG. 17. Also, the concave part 85 is configured so that, when the rear part-side region Rb of the ring part R is entered into the concave part, the driver-side wall part 34A is arranged substantially along the vertical direction. That is, also in the airbag 80, the concave part 85 has a depth (depression amount) T5 (refer to FIG. 13) having a dimension set so that when the ring part R (rear part-side region Rb) is entered into the rear region 28c, the bag main body 81 is entirely inclined relative to the ring surface RF of the steering wheel W so that a rear end (rear part-side region 81b) faces downward, and the driver-side wall part 34A is thus inclined relative to the ring surface RF and can be arranged substantially along the vertical direction.

Specifically, the concave part 85 has an inner wall part 87 arranged at the center side (inlet opening 24A side) and an outer wall part 86 arranged at an outer side (a side distant from the inlet opening 24A), and is configured so that a sectional shape thereof upon completion of the inflation of the bag main body 81 becomes a substantial V-shape tapered over the leading end side. In the airbag 80 of the illustrative embodiment, the concave part 85 is configured so that a leading end 85a of the depression is coupled to the driver-side wall part 34A by the tether 40A arranged in the bag main body 81 to thereby restrain a shape of the depression and length dimensions of the inner wall part 87 and the outer wall part 86 are different. Specifically, the length dimension of the outer wall part 86 is set to be greater than the length dimension of the inner wall part 87. Thereby, upon completion of the inflation of the bag main body 81, the inner wall part 87 follows substantially along a central line CL2 passing the center (mounting center C3) of the inlet opening 24A and extending in the upper and lower direction and an upper end 86a of the outer wall part 86 faces toward the inner wall part 87 (central line CL2), so that the concave part 85 is inclined relative to the central line CL2. The concave part 85 is also configured so that an inner diameter dimension (an inner diameter dimension d6 in a region of the inner side wall part 87; refer to FIG. 12) is set to be smaller than the ring diameter D1 of the steering wheel W, when the airbag 80 (bag main body 81) upon completion of the inflation is seen in the upper and lower direction, and the rear region 85c is thus arranged in the vicinity of the rear part-side region Rb of the ring part R upon completion of the inflation of the bag main body 81 (refer to FIGS. 12 and 16). That is, also in the airbag 80, upon completion of the inflation of the bag main body 81, a front region 85b of the concave part 85 is arranged at a position distant rearward from the ring part R (refer to FIGS. 12 and 16), and when the driver MD is received by the airbag 80 upon completion of the inflation, it is possible to suppress a front part-side region of the ring part R from moving into the front region 85b of the concave part 85.

The tethers 40A arranged in the bag main body 81 are arranged at a plurality of places around the inlet opening 24A so as to couple the leading end 85a of the depression of the concave part 85 and the region in the vicinity of the center of the driver-side wall part 34A. Specifically, like the tethers 40 of the airbag 20, when the airbag 80 upon completion of the inflation is seen in the upper and lower direction, the plurality of (six, in the illustrative embodiment) tethers 40A is arranged in a radial manner so as to pull the concave part 85 upward (toward the driver-side wall part 34) substantially equally over the entire circumference in a region except the opening of the flow regulating cloth 37A, i.e., in a region except the front or rear of the flow regulating cloth 37A around the inlet opening 24A, (refer to FIGS. 13 and 14). Each tether 40A is formed by joining (sewing) an upper region 41A arranged at the driver-side wall part 34A side and a lower region 42A arranged at the vehicle body-side wall part 83 side (concave part 85 side), like the tether 40. Also in the airbag 80, the tether 40A has such a configuration that upon completion of the inflation of the airbag 80, an upper joining region 45A of an upper end 40a side joined to the driver-side wall part 34A side is located at a position closer to a center than a lower joining region 46A of a lower end 40b side joined to the leading end 85a side of the depression of the concave part 85. That is, also in the airbag 80, the upper joining region 45A for joining the upper end 40a side of the tether 40A to the driver-side wall part 34A side is configured so that a spaced distance T6 from the central line CL2 passing the center (mounting center) of the inlet opening 24A and extending in the upper and lower direction is smaller than a spaced distance T7 from the central line CL2 of the lower joining region 46A for joining the lower end 40b side of the tether 40A to the leading end 85a side of the concave part 85 (refer to FIG. 13), and each tether 40A is arranged with being inclined relative to the central line CL2. Also, a length dimension of the tether 40A (a spaced distance T8 between the lower joining region 46A and the upper joining region 45A in the airbag 80 upon completion of the inflation; refer to FIG. 13) is set so that the smooth deployment and inflation of the airbag 80 is not disturbed and the outer wall part 86 and the inner wall part 87 configuring the concave part 85 are not loosened and the leading end 85a of the concave part 85 can be pulled toward the driver-side wall part 34A upon completion of the inflation of the airbag 80 (bag main body 81). Also, the length dimension of the tether 40A is set so that upon completion of the inflation of the airbag 80, while the ring part R is allowed to enter into the concave part 85, when the abdominal region of the driver MD is received by the rear part-side region 80b, the bottoming is suppressed to correctly protect the abdominal region of the driver MD.

Figure 15:
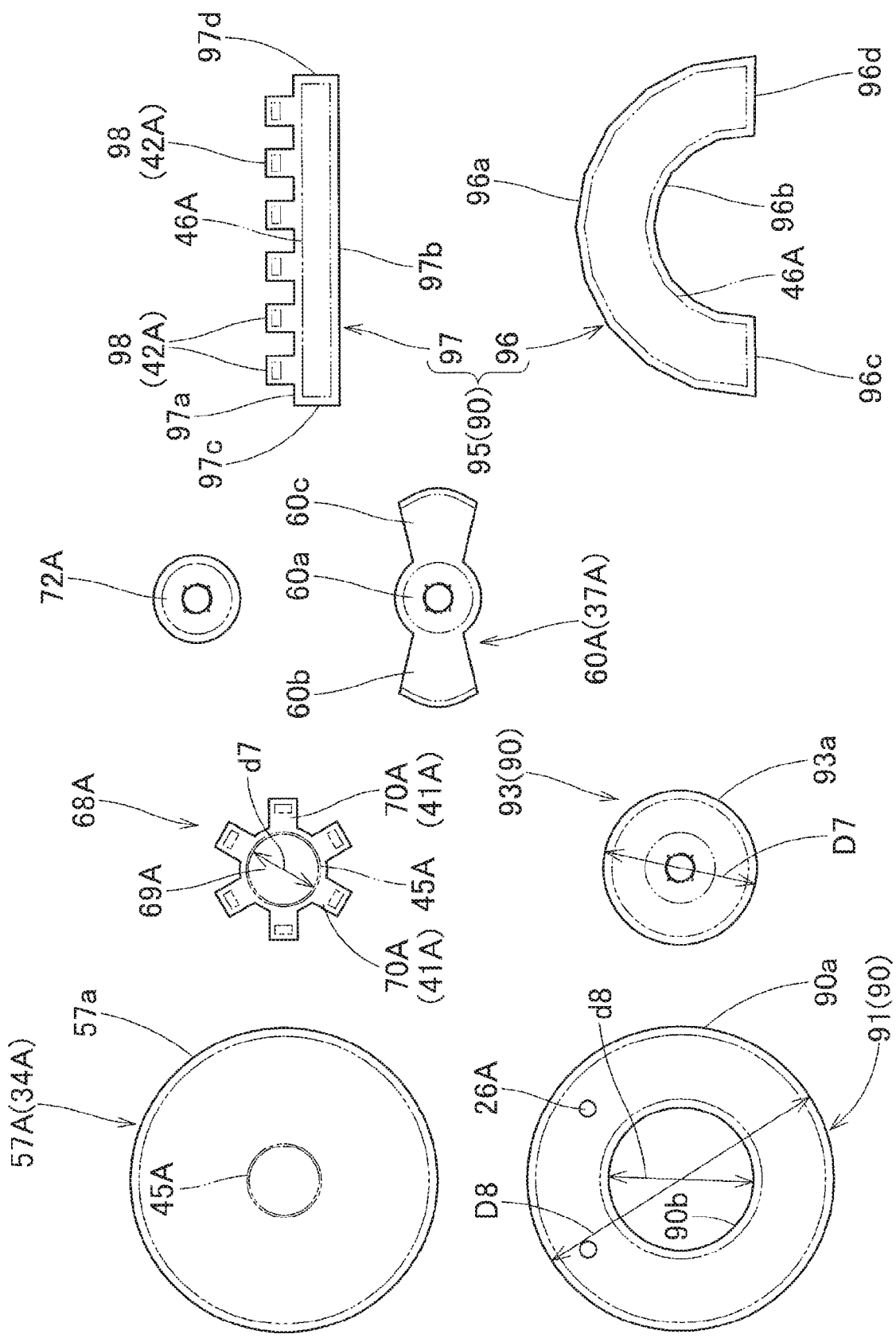
FIG. 15 is a plan view of a base fabric configuring the airbag of FIG. 11.

In the airbag 80 of the second illustrative embodiment, the tether 40A is configured by a base fabric 68A for tether and tether configuring parts 98 extending from an inner region 97 of a panel part 95 for concave part (which will be described later) configuring the concave part 85, as shown in FIG. 15. The base fabric 68A for tether that is arranged at the vehicle body-side wall part 34A side has a configuration similar to the base fabric 68 for tether of the airbag 20. The tether configuring part 98 configures the lower region 42A of the tether 40A, has a substantial band shape protruding from an upper edge 97a of the inner region 97, and is formed integrally with the inner region 97. That is, in the airbag 80 of the illustrative embodiment, a vicinity of a boundary region between the tether configuring part 98 and the inner region 97 configures the lower joining region 46A for joining the lower end 40b of the tether 40A to the leading end 85a of the concave part 85. In the illustrative embodiment, a region in which the upper edge 97a of the inner region 97 and an inner edge 96b of the outer region 96 are joined (sewn) is described as configuring the lower joining region 46A. The inner region 97 is a region configuring the inner wall part 87 of the concave part 85 of the bag main body 81, and is configured to be arranged substantially in the upper and lower direction upon completion of the inflation of the airbag 80. That is, the inner region 97 is arranged in a substantially cylindrical shape upon completion of the inflation of the bag main body 81, and the lower edge 97b of the inner region 97 is joined to an outer peripheral edge 93a of a central panel part 93 (which will be described later) of the vehicle body-side panel 90, as described later. Accordingly, upon completion of the inflation, an inner diameter dimension of a region at the upper edge 97a side substantially coincides with an outer diameter dimension D7 (refer to FIG. 15) of the central panel part 93. As shown in FIG. 15, the outer diameter dimension D7 of the central panel part 93 is set to be greater than an inner diameter dimension d7 of the upper joining region 45A formed by sewing the vicinity of the outer peripheral edge 69a of the mounting base part 69A of the base fabric 68A for tether. Thereby, in the airbag 80 of the illustrative embodiment, the spaced distances T6, T7 of the upper joining region 45A and the lower joining region 46A of each tether 40A from the central line CL2 are different. Each tether 40A is arranged with being inclined relative to the central line CL2 so that the lower end 40b side is to be expanded. Thereby, the concave part 85 that is to be pulled by the tether 40A is arranged with being inclined relative to the central line CL2 so that the leading end 85a of the depression faces toward the central line CL2. In the illustrative embodiment, the concave part 85 has such a configuration that the length dimension of the outer wall part 86 is set to be greater than the length dimension of the inner wall part 87 and the outer wall part 86 is inclined relative to the central line CL2 so that the upper end 86a faces toward the central line CL2, and the inclination state of the outer wall part 86 can be stabilized by the tether 40A upon completion of the inflation of the airbag 80. For this reason, upon completion of the inflation of the airbag 80, the outer wall part 86 of the concave part 85 arranged at the outer side distant from the inlet opening 24A becomes a guide surface, so that when making the ring part R enter into the concave part, it is possible to make the ring part R further smoothly enter into the concave part 85.

In the airbag 80 of the second illustrative embodiment, the vehicle body-side panel 90 configuring the vehicle body-side wall part 83 has a substantially circular ring-shaped outer panel part 91 of which an outer diameter dimension D8 (refer to FIG. 15) is made to be substantially the same as the driver-side panel 57A, a substantially circular central panel part 93, and a panel part 95 for concave part arranged between the outer panel part 91 and the central panel part 93 and configuring the concave part 85. The outer panel part 91 configures a region of the outer peripheral edge 83a side of the vehicle body-side wall part 83, and an outer peripheral edge 91a is joined to the outer peripheral edge 57a of the driver-side panel 57A. The central panel part 93 configures a central region of the vehicle body-side wall part 83 and has the inlet opening 24A, and an outer diameter dimension D7 is set to be slightly smaller than an inner diameter dimension d8 of the opening region of the outer panel part 91.

The panel part 95 for concave part has an outer region 96 arranged at the outer panel part 91 side and an inner region 97 arranged at the central panel part 93 side. The outer region 96 configures the outer wall part 86 of the concave part 85, and the inner region 97 configures the inner wall part 87 of the concave part 85. As shown in FIG. 15, the outer region 96 has a band shape bent into a substantially semi-circular arc shape. Therefore, when end edges 96c, 96d at the longitudinal direction side are joined to each other, the outer wall part 86 is configured, and an outer edge 96a is joined to the inner peripheral edge 91b of the outer panel part 91 and an inner edge 96b is joined to the upper edge 97a of the inner region 97. In the illustrative embodiment, the outer edge 96a and the inner edge 96b of the outer region 96 have a shape approximated to a curved line by coupling a plurality of straight lines. The inner region 97 has a band shape where end edges (the upper edge 97a and the lower edge 97b) facing each other are formed to have linear shapes substantially parallel with each other. When end edges 97c, 97d at the longitudinal direction side are joined to each other, the inner wall part 87 is configured, and a lower edge 87b is joined to the outer peripheral edge 93a of the central panel part 93 and an upper edge 87a is joined to the inner edge 96b of the outer region 96 so as to form the lower joining region 46A. The upper edge 97a of the inner region 97 is formed with the six tether configuring parts 98 configuring the lower region 42A of the tether 40A.

Also in the airbag 80 of the second illustrative embodiment, the driver-side panel 57A and the vehicle body-side panel 90 (the outer panel part 91, the central panel part 93 and the panel part 95 for concave part) configuring the bag main body 81, the reinforcement cloth 72A, the material 60A for flow regulating cloth configuring the flow regulating cloth 37A, and the base fabrics 68A for tether configuring the tether 40A are respectively made of a woven fabric having flexibility and composed of polyester yarn, polyamide yarn or the like. Specifically, in the airbag 80 of the illustrative embodiment, an outer diameter dimension D9 (refer to FIG. 12) of the bag main body 81 upon completion of the inflation is set to about 590 mm, and an inner diameter dimension d6 of the concave part 85 of the bag main body 81 is set to about 250 mm. Also, the depth T1 of the depression of the concave part 85 is set to about 80 mm in the bag main body 81 upon completion of the inflation.

The airbag 80 can be manufactured in the similar manner to the airbag 20, and can be mounted to the vehicle in the similar manner to the airbag 20. Meanwhile, in the airbag 80, when joining (sewing) the inner peripheral edge 91b of the outer panel part 91 and the outer edge 96a of the outer region 96 of the panel part 95 for concave part, and when joining (sewing) the outer peripheral edge 93a of the central panel part 93 and the lower edge 97b of the inner region 97 of the panel part 95 for concave part, a three-dimensional sewing (joining) operation is performed.

Also in the airbag 80, the concave part 85 into which the ring part R of the steering wheel W can enter upon completion of the inflation is formed to be concave upward toward the driver-side wall part 34A side at the vehicle body-side wall part 83 (refer to FIG. 16). That is, also in the airbag 80 of the illustrative embodiment, since the concave part 85 is formed by recessing the airbag 80 (bag main body 81) itself, it is possible to suppress an increase in volume. Also in the airbag 80 configured as described above, upon completion of the inflation of the airbag 80, when the driver MD is moved forward and is contacted to the rear part-side region 81b of the airbag 80 (bag main body 81) having inflated to cover the steering wheel W, the rear part-side region 81b of the airbag 80 (bag main body 81) is moved forward to make the rear part-side region Rb of the ring part R enter into the rear region 85c of the concave part 85, as shown in FIG. 17. Accordingly, it is possible to stabilize the arrangement position of the airbag 80 relative to the steering wheel W (ring part R), and to stably receive the driver MD moving forward by the airbag 80 arranged to cover the ring part R. Also in the airbag 80 configured as described above, the rear part-side region 81b of the airbag 80 (bag main body 81) is pushed by the driver MD moving forward and is moved forward to make the ring part R enter into the concave part 88. Accordingly, it is possible to suppress the rear part-side region 81b from pressing the chest BA of the driver MD.

Also in the airbag 80 of the second illustrative embodiment, when the driver MD is received, the driver-side wall part 34A is arranged substantially along the vertical direction UD, as shown in FIG. 17. That is, also in the airbag 80 of the illustrative embodiment, as the rear part-side region 81b of the airbag 80 (bag main body 81) is moved forward, the front part-side region 81a of the airbag 80 (bag main body 81) arranged with the inlet opening 24A being interposed with respect to the rear part-side region 81b is arranged to float above the steering wheel W. For this reason, also in the airbag 80 of the illustrative embodiment, upon completion of the inflation, when the driver MD is moved forward, it is possible to suppress the rear part-side region 81b from pressing the chest BA of the driver MD, to receive the upper body UB of the driver MD over a wide range by the driver-side wall part 34A arranged substantially along the vertical direction UD so as to substantially face the upper body UB of the driver MD, and to softly receive the head H of the driver MD by the front part-side region 81a of the bag main body 81 to inflate in a relatively thick aspect in a gap provided between the head and the ring part R.

Also, in the airbag 80 configured as described above, the inner region 97 and the outer region 96 configuring the facing surfaces (the inner wall part 87 and the outer wall part 86) of the concave part 85 are continuously arranged in the circumferential direction, respectively. Therefore, it is possible to stabilize the depression shape of the concave part 85 over the substantially entire circumference.

Subsequently, an airbag 100 of a third illustrative embodiment of the present invention is described. Like the airbag 20, the airbag 100 is used for the airbag device for steering wheel, and has a bag main body 101, a flow regulating cloth 37B arranged in the bag main body 101, and tethers 111, 117 arranged in the bag main body 101, as shown in FIGS. 18 to 21. In the meantime, the airbag 100 has the same configuration as the airbag 20, except a shape of a concave part 107 that is arranged at a vehicle body-side wall part 105 side of the bag main body 101, a configuration of a vehicle body-side panel 120 configuring the vehicle body-side wall part 105 and the tether 111 for forming the concave part 107. Therefore, the same members are denoted with the same reference numerals having "B" annexed thereto, and the detailed descriptions thereof are omitted.

Figure 23:
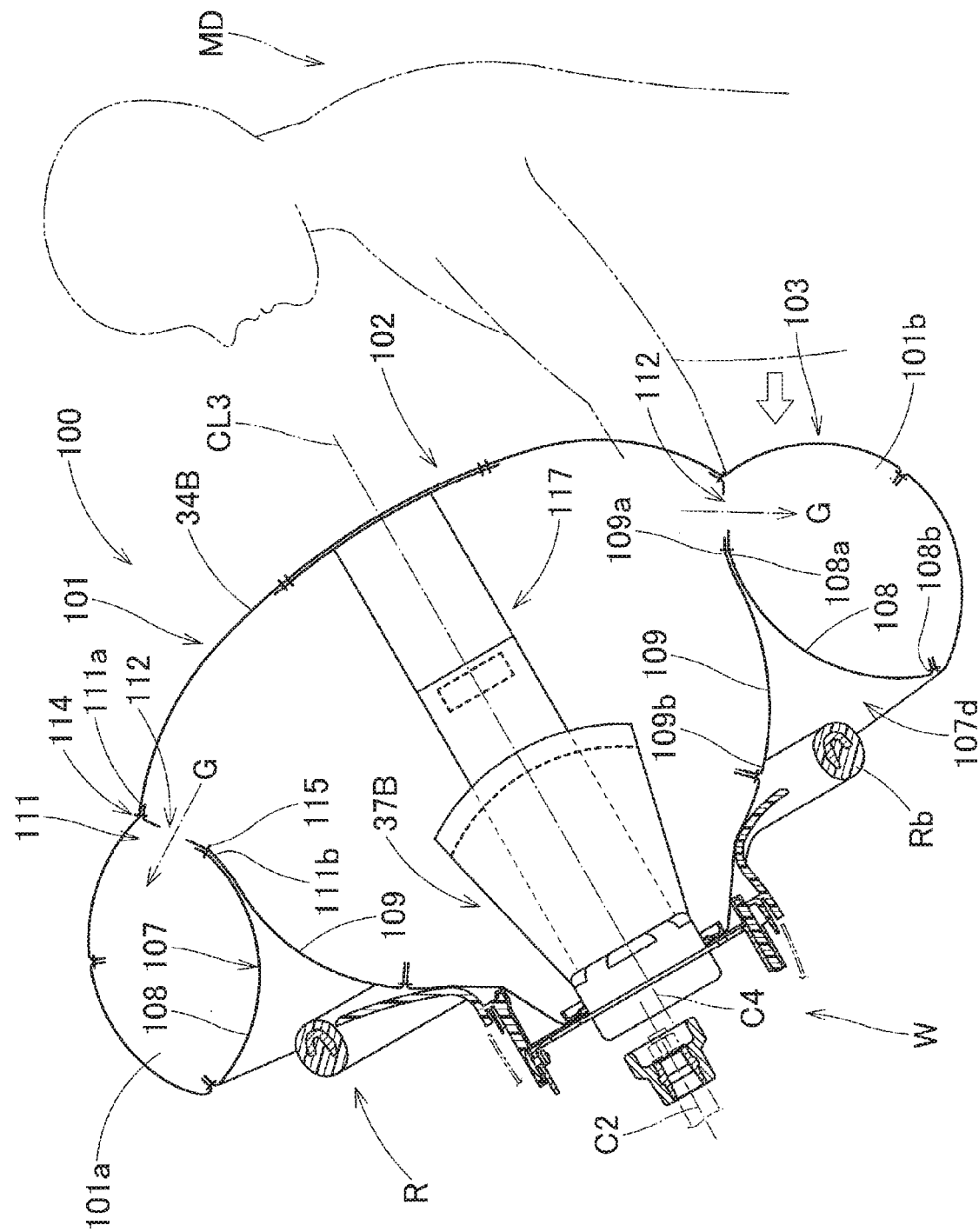
FIG. 23 is a schematic longitudinal sectional view depicting a state where inflation of the airbag has completed in the airbag device for steering wheel, in which the airbag of the third illustrative embodiment is used.

Like the bag main bodies 21, 81, the bag main body 101 is mounted to the steering wheel W in a state where a mounting center C4 (a center of an inlet opening 24B) slightly deviates rearward with respect to the rotation center C2 of the steering wheel W, and is configured to cover the upper surface of the ring part R over a substantially entire surface upon completion of the inflation with the mounting center C4 being offset (refer to FIG. 23).

Figure 19:
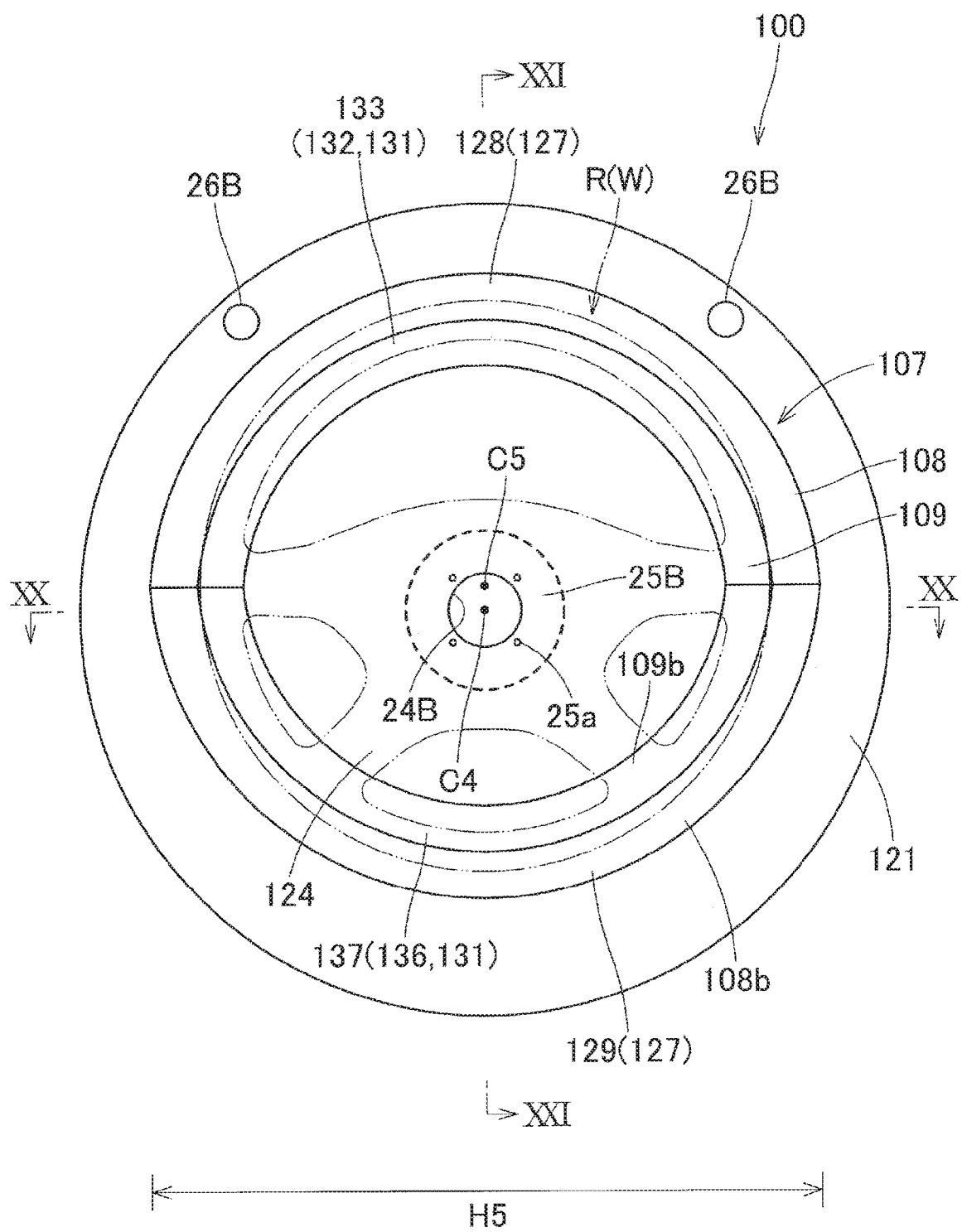
FIG. 19 is a bottom view of the single inflated airbag of FIG. 18.

The vehicle body-side wall part 105 of the bag main body 101 is formed with a concave part 107 that is concave upward toward a driver-side wall part 34B side upon completion of the inflation. The concave part 107 has a substantially circular ring shape substantially along the ring part R when the airbag 100 (bag main body 101) upon completion of the inflation is seen in the upper and lower direction. Specifically, as shown in FIG. 19, when the bag main body 101 upon completion of the inflation is seen in the upper and lower direction, the concave part 107 is formed to have a substantially circular ring shape, which is slightly different from an outer peripheral edge of the bag main body 101, in a region between the inlet opening 24B and a vent hole 26B. Specifically, the concave part 107 is configured so that an outer shape thereof upon completion of the inflation of the airbag 100 is to be a substantially elliptical ring shape of which a width dimension in the front and rear direction is set to be slightly smaller than a width dimension in the left and right direction and a center C5 (refer to FIG. 19) is to be arranged at a position at which the center substantially coincides with a rotation center C2 (refer to FIG. 23) of the ring part R of the steering wheel W, when the bag main body 101 is seen in the upper and lower direction. That is, the concave part 107 is arranged in a state where the center C5 is offset forward with respect to the center (the mounting center C4) of the inlet opening 24B of the bag main body 101. Specifically, in the third illustrative embodiment, the concave part 107 is configured to open a lower end 107b side upon completion of the inflation of the airbag 100 (refer to FIGS. 20 and 21), and lower ends 108b, 109b of an inner wall part 109 and an outer wall part 108 configuring the concave part 107 are arranged into a substantially double circular shape, when the bag main body 101 is seen from below (refer to FIG. 19).

Figure 20:
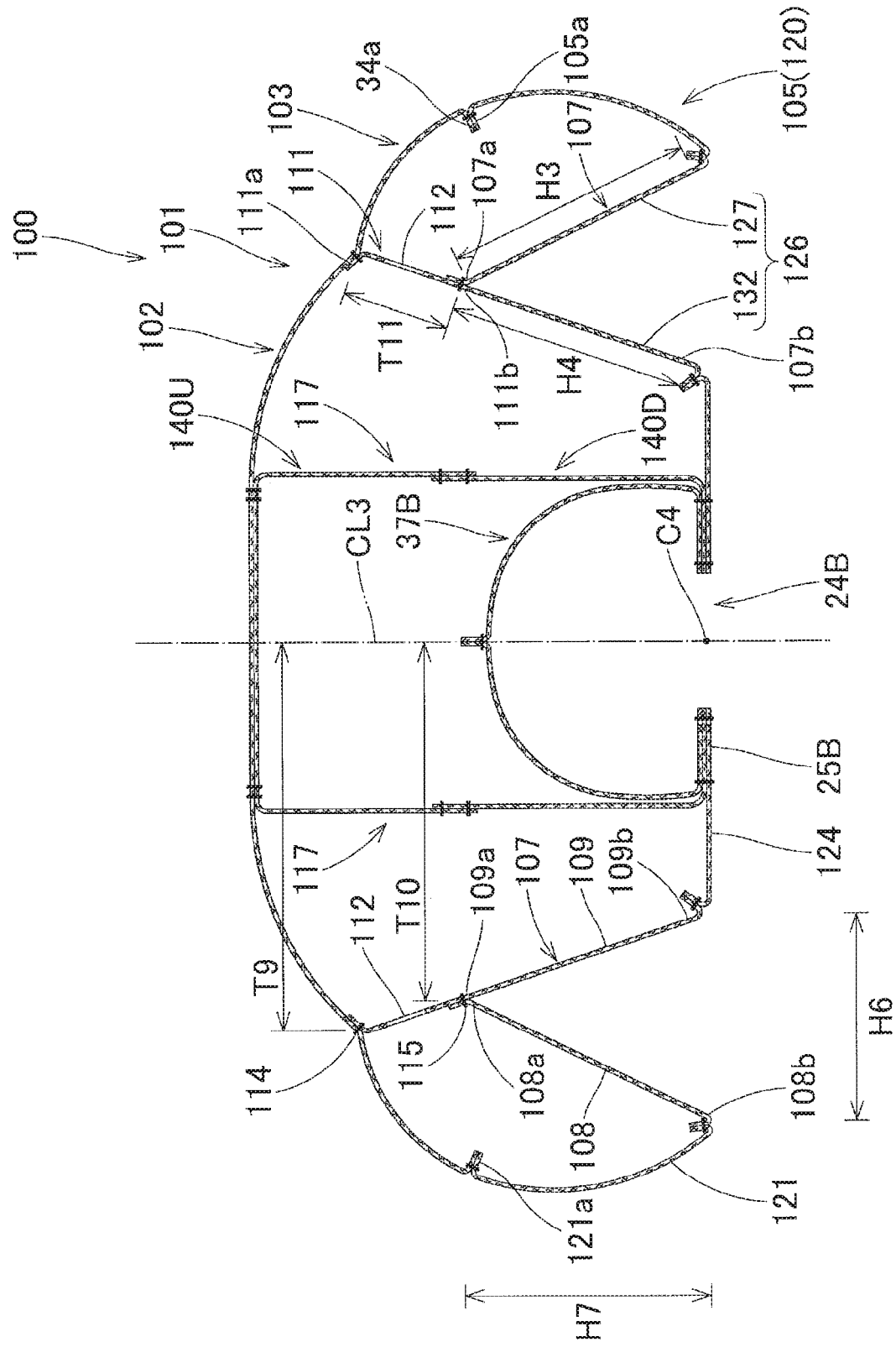
FIG. 20 is a sectional view taken along a line XX-XX of FIG. 19.
Figure 21:
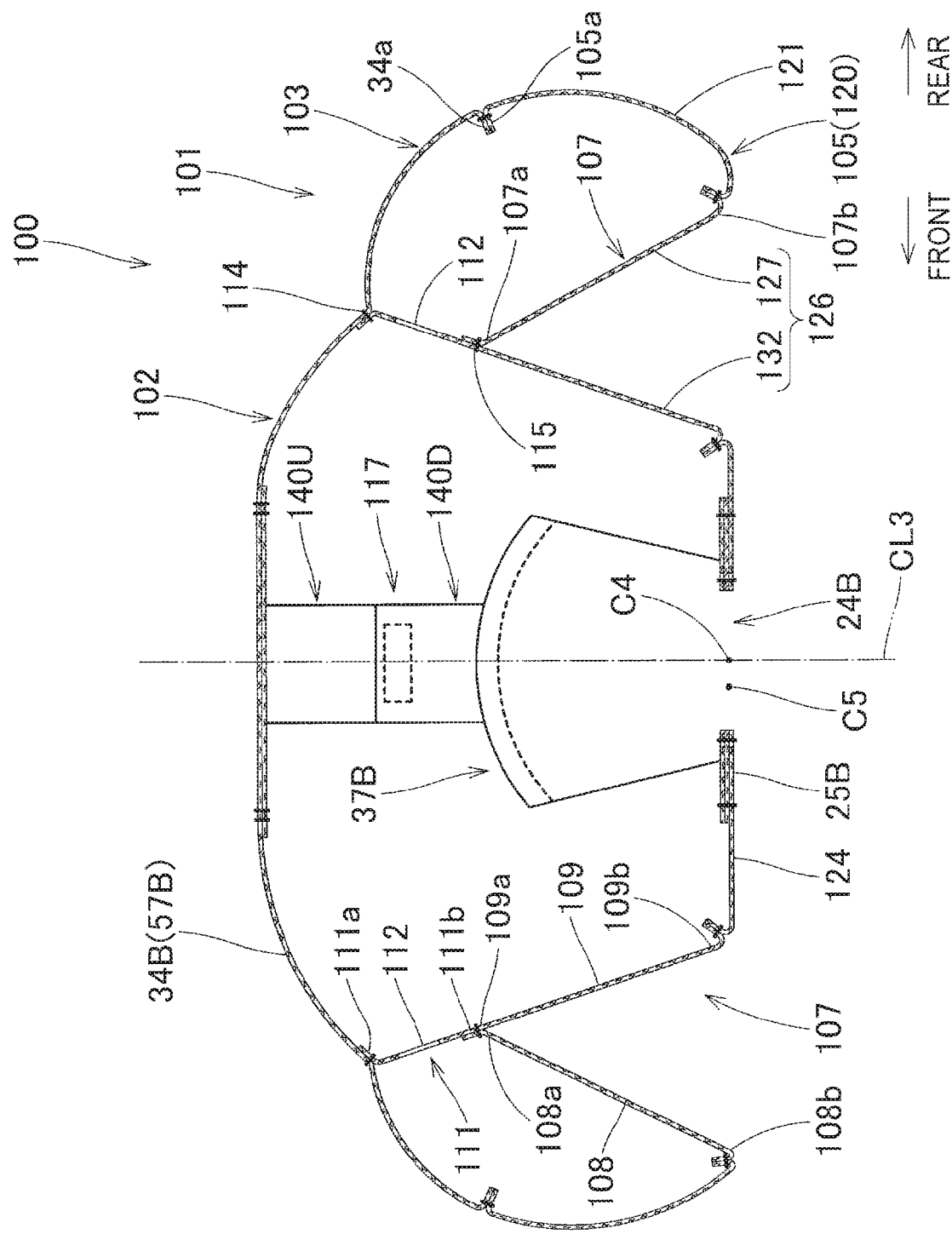
FIG. 21 is a sectional view taken along a line XXI-XXI of FIG. 19.

Also, as shown in FIGS. 20 and 21, the concave part 107 is configured so that a leading end (an upper end 107a) of a depression is coupled to the driver-side wall part 34B side by the tether 111 arranged in the bag main body 101, a shape of the depression is thus restrained and upon completion of the inflation of the bag main body 101 (the airbag 100), the lower end 107b side which corresponds to the ring part R side is to be widely opened and the concave part is to converge toward the leading end (the upper end 107a). In the third illustrative embodiment, the concave part 107 has the inner wall part 109 arranged at a center side (the inlet opening 24B side) and the outer wall part 108 arranged at an outer side (a side distant from the inlet opening 24B). The inner wall part 109 has a root part end (the lower end 109b), which is to be the vehicle body-side wall part 105 side, and the root part end is to be arranged at an inner position closer to the inlet opening 24B than the ring part R upon completion of the inflation of the airbag 100 (the bag main body 101) (refer to FIG. 23). Also, an upper end 109a of the inner wall part 109, which is the leading end of the depression, is located at an outermore position than the lower end 109b, so that the inner wall part 109 is arranged with being inclined relative to the upper and lower direction upon completion of the inflation of the airbag 100 (refer to FIGS. 20 and 21). The outer wall part 108 has a root part end (the lower end 108b), which is to be the vehicle body-side wall part 105 side, and the root part end is located at an outer position, which is more distant from the inlet opening 24B than the ring part R upon completion of the inflation of the airbag 100 (the bag main body 101) (refer to FIG. 23). In the third illustrative embodiment, the lower end 108b of the outer wall part 108 is located at an outermore position than the upper end 108a which corresponds to the leading end of the depression. That is, upon completion of the inflation of the airbag 100, the upper end 108a is located at a more inner position than the lower end 108b, so that the outer wall part 108 is arranged with being inclined relative to the upper and lower direction (refer to FIGS. 20 and 21). Upon the actual inflation of the airbag 100, the bag main body 101 inflates by enabling the inflation gas to be introduced therein. Therefore, the inner wall part 109 and the outer wall part 108 configuring the concave part 107 are also arranged with being curved, in conjunction with the inflation (refer to FIG. 23). In the third illustrative embodiment, the concave part 107 is configured so that the ring part R is to be arranged in a region between the outer wall part 108 and the inner wall part 109 upon completion of the inflation of the airbag 100. Also, in the concave part 107 of the third illustrative embodiment, the inner wall part 109 is configured so that a width dimension H4 in the upper and lower direction is slightly smaller than a width dimension H3 of the outer wall part 108 in the upper and lower direction (refer to FIGS. 20 and 22).

A depression shape of the concave part 107 upon completion of the inflation of the bag main body 101 is restrained by the tether 111 arranged in the bag main body 101 and configured to couple the leading end (the upper end 107a) of the depression of the concave part 107 and the driver-side wall part 34B. The tether 111 is to pull the concave part 107 toward the upper side (the driver-side wall part 34B side) substantially equally over an entire circumference. In the third illustrative embodiment, the tether 111 has a substantially cylindrical outer shape upon completion of the inflation of the airbag 100 and is configured to couple the leading end (the upper end 107a) of the depression of the concave part 107 and the driver-side wall part 34B. That is, in the airbag 100 of the third illustrative embodiment, the bag main body 101 is demarcated into a central region 102 closer to the center side (an inner side of the tether 111) than the concave part 107 and an outer region 103 closer to the outer side (an outer side of the tether 111) than the concave part 107 by the tether 111 and the concave part 107. The tether 111 is formed with a plurality of communication holes 112 configured to communicate the central region 102 and the outer region 103 each other and arranged radially about the inlet opening 24B. In the third illustrative embodiment, the plurality of (twenty) communication holes 112, each of which opens in a circular shape, is arranged (refer to FIG. 22). The tether 111 is configured so that a spaced distance T9 of an upper joining region 114 at an upper end 111a side to be joined to the driver-side wall part 34B from a central line CL3, which passes the center (the mounting center C4) of the inlet opening 24B and extends substantially in the upper and lower direction, is greater than a spaced distance T10 of a lower joining region 115 at a lower end 11b side to be joined to the leading end (the upper end 107a) of the depression of the concave part 107 from the central line CL3 upon completion of the inflation of the airbag 100 (refer to FIG. 20). That is, the tether 111 is configured to be arranged with being inclined relative to the central line CL3 so that the upper joining region 114 is to be located at the outer side and the lower joining region 115 is to be located at the central side upon completion of the inflation of the bag main body 101. A length dimension of the tether 111 (a spaced distance T11 between the lower joining region 115 and the upper joining region 114 in the airbag 100 upon completion of the inflation; refer to FIG. 20) is set so that the smooth deployment and inflation of the airbag 100 is not disturbed and the outer wall part 108 and the inner wall part 109 configuring the concave part 107 are not loosened and the leading end (the upper end 107a) of the concave part 107 can be pulled toward the driver-side wall part 34B upon completion of the inflation of the airbag 100 (the bag main body 101).

Figure 18:
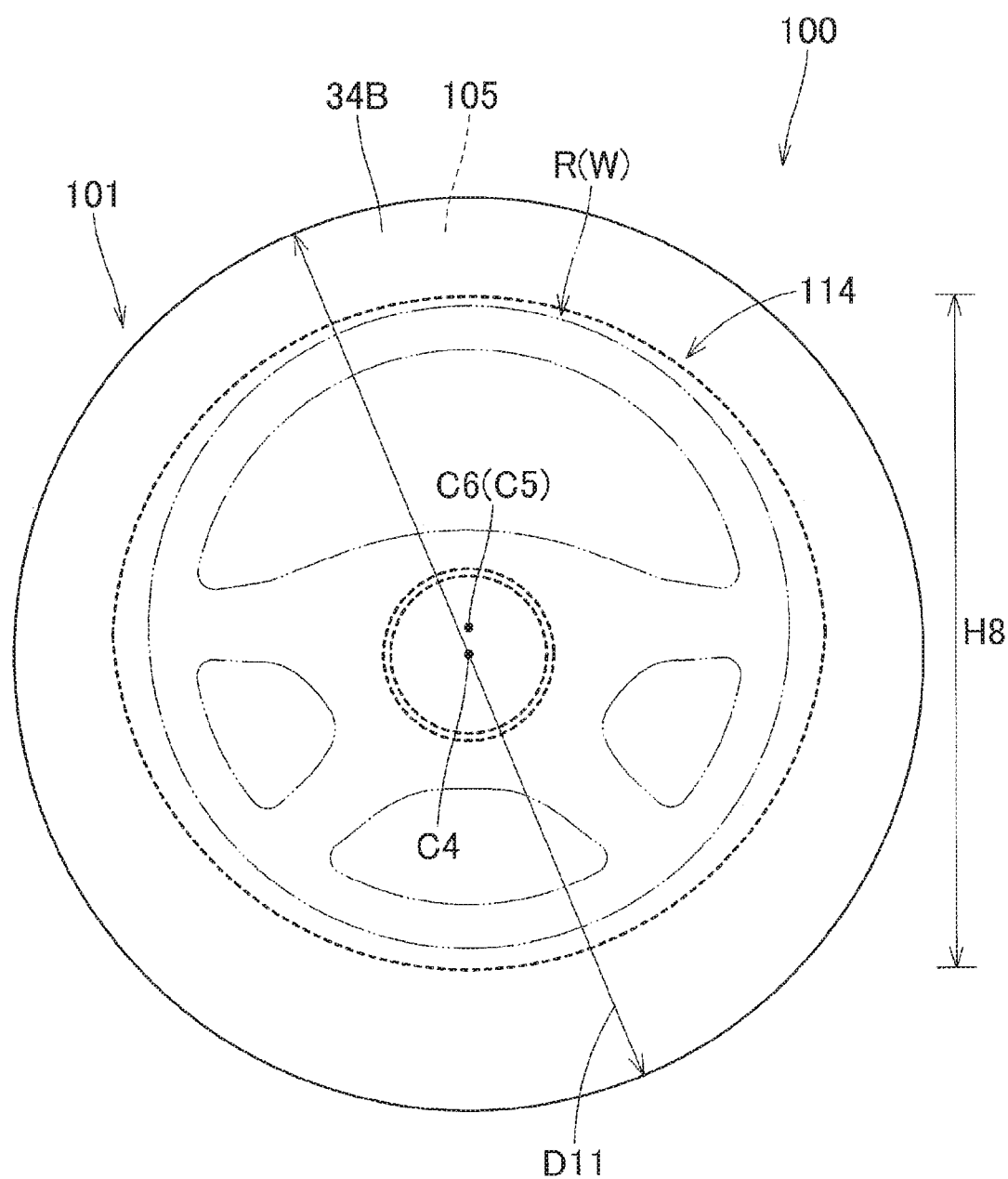
FIG. 18 is a plan view of a single inflated airbag of a third illustrative embodiment of the present invention.

Also, in the third illustrative embodiment, the upper joining region 114 at which the tether 111 is joined to the driver-side wall part 34B is configured to have a substantially elliptical shape of which a width dimension in the front and rear direction is set to be slightly smaller than a width dimension in the left and right direction and a center C6 is offset forward with respect to the mounting center C4 (the center of the driver-side wall part 34B) of the bag main body 101, in conformity to the outer shape of the concave part 107, when the bag main body 101 is seen in the upper and lower direction (in a state where the driver-side wall part 34B is deployed flat) (refer to FIG. 18). The center C6 of the upper joining region 114 is arranged substantially to coincide with the rotation center C2 of the ring part R when the airbag is mounted to the vehicle. Also, in the third illustrative embodiment, the upper joining region 114 joining the tether 111 to the driver-side wall part 34B is arranged at an outermore position than the ring part R upon completion of the inflation of the airbag 100, as shown in FIGS. 18 and 23. That is, the upper joining region 114 has a width dimension H8 in the front and rear direction greater than a ring diameter D1 of the steering wheel W (refer to FIG. 18).

Figure 22:
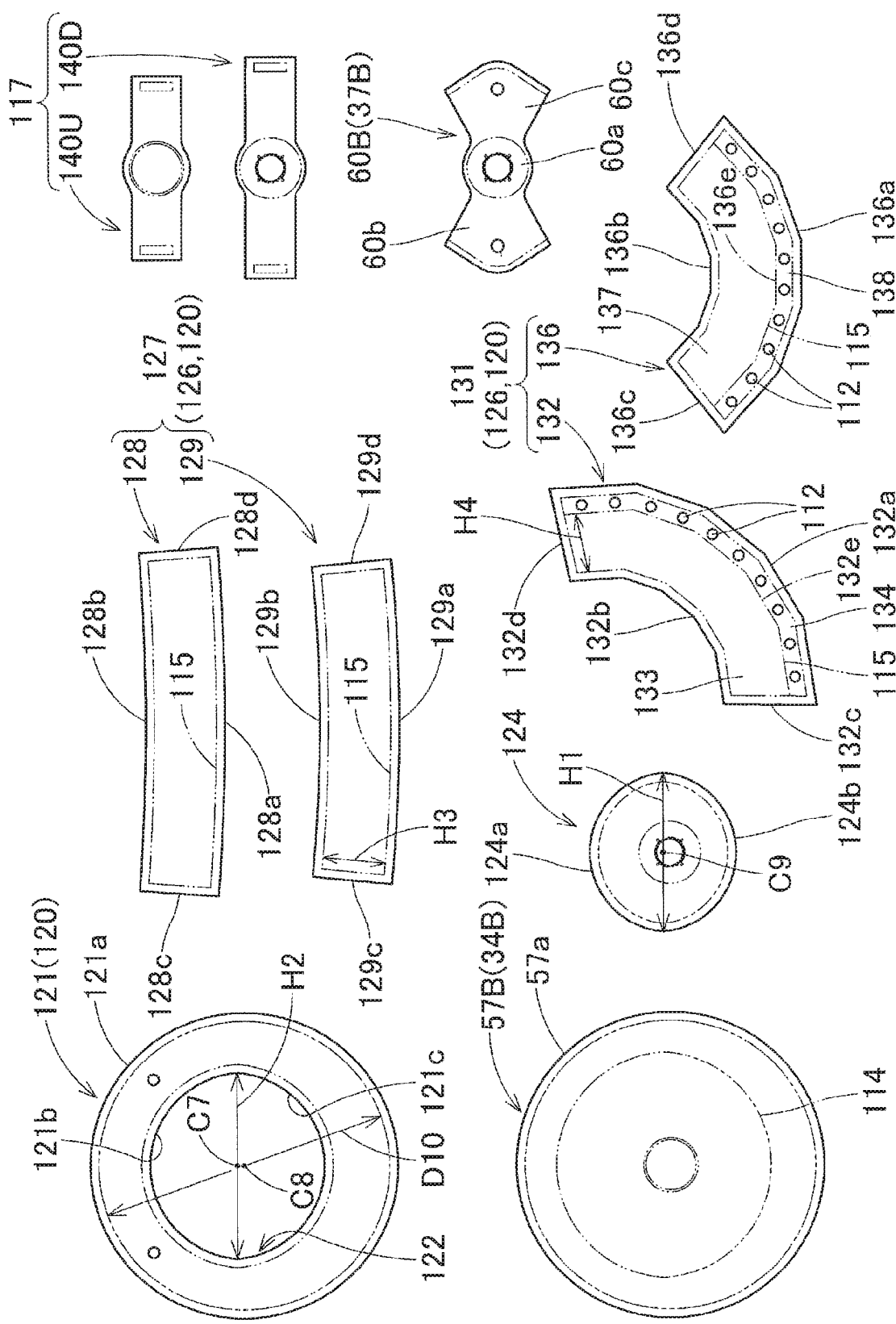
FIG. 22 is a plan view of base fabrics configuring the airbag of FIG. 18.

In the airbag 100 of the third illustrative embodiment, as shown in FIG. 22, the tether 111 is formed by tether configuring parts 134, 138 formed at an inner region 131 of a panel part 126 for concave part configuring the concave part 107. The inner region 131 of the panel part 126 for concave part has a band shape curved in a substantially circular arc shape, and is configured by two parts of a front configuring part 132 and a rear configuring part 136 having different curvatures, in the third illustrative embodiment. The tether configuring parts 134, 138 are configured by regions of upper edges 132a, 136a of the front configuring part 132 and the rear configuring part 136. In the airbag 100, boundary edges 132e, 136e, which configure boundaries of the tether configuring parts 134, 138 and inner wall configuring parts 133, 137, of the front configuring part 132 and the rear configuring part 136 are joined to upper edges 128a, 129a of an outer region 127 (a front configuring part 128 and a rear configuring part 129) of the panel part 126 for concave part, so that the lower joining region 115 is configured, and upper edges 132a, 136a of the front configuring part 132 and the rear configuring part 136 are joined to a driver-side panel 57B configuring the driver-side wall part 34B, so that the upper joining region 114 is configured. In the tether configuring parts 134, 138, the upper edges 132a, 136a configuring the upper joining region 114 and the boundary edges 132e, 136e configuring the lower joining region 115 are arranged in substantially parallel in the flat deployed state (refer to FIG. 22), and circumferential lengths of the boundary edge 132e, 136e are set to be shorter than the upper edges 132a, 136a. That is, upon completion of the inflation of the bag main body 101, the tether 111 formed by the tether configuring parts 134, 138 is arranged in a substantially cylindrical shape where an inner diameter dimension of a region of the lower end 111b side surrounded by the lower joining region 115 is set to be smaller than an inner diameter dimension of a region of the upper end 111a side surrounded by the upper joining region 114. Thereby, in the airbag 100 of the third illustrative embodiment, the spaced distances T9, T10 of the upper joining region 114 and the lower joining region 115 of the tether 111 from the central line CL3 are different from each other.

Also, in the airbag 100 of the third illustrative embodiment, the tether 117 for coupling the vicinity of the center of the driver-side wall part 34B and the vicinity of the inlet opening 24B is arranged in the bag main body 101, separately from the tether 111 (refer to FIGS. 20 and 21). The tether 117 is to restrain the spaced distance of the driver-side wall part 34B from the vehicle body-side wall part 105 upon completion of the inflation of the airbag 100, and is configured by base fabrics 140U, 140D for tether as shown in FIG. 22. Also in the airbag 100, the flow regulating cloth 37B is arranged in the bag main body 101.

The bag main body 101 is configured by a driver-side panel 57B configuring the driver-side wall part 34B and a vehicle body-side panel 120 configuring the vehicle body-side wall part 105. The driver-side panel 57B has a substantially circular plate shape.

The vehicle body-side panel 120 has an outer panel part 121 having a substantially circular ring shape of which an outer diameter dimension D10 is made to be substantially the same as the driver-side panel 57B, a central panel part 124, and a panel part 126 for concave part arranged between the outer panel part 121 and the central panel part 124 and configuring the concave part. The outer panel part 121 configures a region of the outer peripheral edge 105a side of the vehicle body-side wall part 105, and has an outer peripheral edge 121a joined to an outer peripheral edge 57a of the driver-side panel 57B. The outer panel part 121 has a substantially elliptical shape of which the outer peripheral edge 121a is a true circle shape having the same shape as the outer peripheral edge 57a of the driver-side panel 57B and an opening shape of an opening 122 provided at a center is slightly different from a true circle. Specifically, the opening 122 of the outer panel part 121 has an elliptical shape of which a width dimension in the front and rear direction is set to be slightly smaller than a width dimension in the left and right direction and a center C7 is located in front of a center C8 (which coincides with the mounting center C4) of the outer panel part 121 with being offset with respect to the center C8. Specifically, the opening 122 is formed to have an elliptical shape where a front region (a front inner peripheral edge 121b) and a rear region (a rear inner peripheral edge 121c) are made to have different curvatures. Specifically, in the third illustrative embodiment, the opening 122 is formed to have a substantially elliptical shape where the front inner peripheral edge 121b is made to have a curvature set to be greater than the rear inner peripheral edge 121c. The central panel part 124 configures a central region of the vehicle body-side wall part 105 and has an inlet opening 24B. The central panel part 124 has a substantially elliptical outer shape that is substantially similar to the opening 122 of the outer panel part 121 and is smaller than the opening shape of the opening 122. That is, the central panel part 124 has a width dimension H1 in the left and right direction smaller than the width dimension H2 of the opening 122 in the left and right direction. A center C9 of the central panel part 124 is offset with respect to a center (the mounting center C4) of the inlet opening 24B.

The panel part 126 for concave part has an outer region 127 arranged at the outer panel part 121 side and an inner region 131 arranged at the central panel part 124 side. The outer region 127 configures the outer wall part 108 of the concave part 107, and the inner region 131 configures the inner wall part 109 of the concave part 107 and the tether 111.

The outer region 127 is configured by two parts of a front configuring part 128 configuring a front region of the outer wall part 108 and a rear configuring part 129 configuring a rear region. The front configuring part 128 and the rear configuring part 129 have a band shape slightly bent in the longitudinal direction, respectively, and are configured to have different curvatures, in correspondence to a difference of the curvatures of the inner peripheral edges 121b, 121c of the outer panel part 121. The front configuring part 128 and the rear configuring part 129 configure the outer wall part 108 by joining end edges 128c, 128d, 129c, 129d in the longitudinal direction, lower edges 128b, 129b of the front configuring part 128 and the rear configuring part 129 are respectively joined to the inner peripheral edges 121b, 121c of the outer panel part 121, and upper edges 128a, 129a are respectively joined to the boundary edges 132e, 136e of the front configuring part 132 and rear configuring part 136 of the inner region 131, so that the lower joining region 115 is formed.

Like the outer region 127, the inner region 131 is configured by two parts of a front configuring part 132 configuring a front region of the inner wall part 109 and a rear configuring part 136 configuring a rear region. The front configuring part 132 and the rear configuring part 136 have a band shape slightly bent in a substantially circular arc shape, respectively, and are configured to have different curvatures, in correspondence to a difference of the curvatures of outer peripheral edges 124a, 124b of the central panel part 124. The front configuring part 132 and the rear configuring part 136 are configured so that the inner wall configuring parts 133, 137 configuring the inner wall part 109 and the tether configuring parts 134, 138 configuring the tether 111 are coupled in the upper and lower direction. Specifically, the tether configuring parts 134, 138 are configured by regions of the upper edges 132a, 136a of the front configuring part 132 and the rear configuring part 136, respectively. The front configuring part 132 and the rear configuring part 136 configure the inner wall part 109 and the tether 111 by joining end edges 132c, 132d, 136c, 136d in the longitudinal direction, lower edges 132b, 136b of the front configuring part 132 and the rear configuring part 136 are respectively joined to the outer peripheral edges 124a, 124b of the central panel part 124, and upper edges 132a, 136a are joined to the driver-side panel 57B, so that the upper joining region 114 is formed. The upper edges 132a, 136a and the lower edges 132b, 136b of the front configuring part 132 and the rear configuring part 136 have a shape approximate to a curve by coupling a plurality of straight lines.

Also in the airbag 100 of the third illustrative embodiment, the driver-side panel 57B configuring the bag main body 101, the vehicle body-side panel 120 (the outer panel part 121, the central panel part 124 and the panel part 126 for concave part), the flow regulating cloth material 60B configuring the flow regulating cloth 37B and the base fabrics 140U, 140D for tether configuring the tether 117 are respectively made of a woven fabric having flexibility and composed of polyester yarn, polyamide yarn or the like. Specifically, in the airbag 100 of the third illustrative embodiment, an outer diameter dimension D1 (refer to FIG. 18) of the bag main body 101 upon completion of the inflation is set to about 530 mm, and a width dimension H5 (refer to FIG. 19) in the right and left direction of the region of the lower end 108b of the outer wall part 108 of the concave part 107 of the bag main body 101 is set to about 450 mm. Also, upon completion of the inflation of the bag main body 101, an opening width dimension H6 (refer to FIG. 20) of the lower end 107b of the concave part 107 is set to about 80 mm, and a depth H7 of the depression of the concave part 107 is set to about 130 mm (refer to FIG. 20).

The airbag 100 can be manufactured in the same manner as the airbags 20, 80 and can be mounted to the vehicle in the same manner as the airbags 20, 80. Also in the airbag 100, like the airbag 80, when joining (sewing) the inner peripheral edges 121b, 121c of the outer panel part 121 and the upper edges 128a, 129a of the outer region 127 of the panel part 126 for concave part, and when joining (sewing) the outer peripheral edges 124a, 124b of the central panel part 124 and the lower edges 132b, 136b of the inner region 131 of the panel part 126 for concave part, the three-dimensional sewing (joining) operation is performed.

Figure 24:
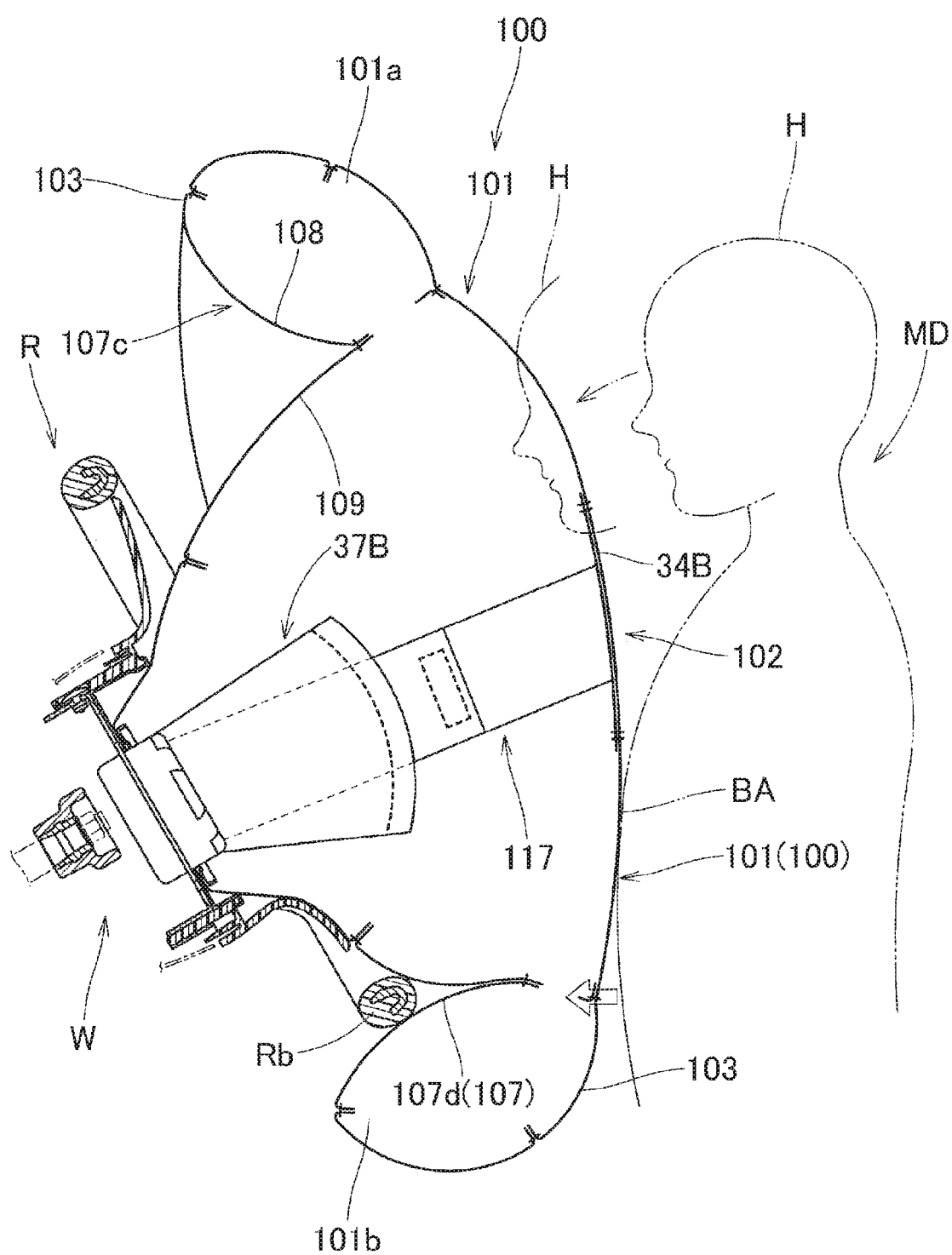
FIG. 24 is a schematic longitudinal sectional view depicting a state where the airbag after completion of the inflation in the airbag device for steering wheel, in which the airbag of the third illustrative embodiment is used, has received a chest of a driver moving forward.

Also in the airbag 100 of the third illustrative embodiment, the concave part 107 into which the ring part R of the steering wheel W can enter upon completion of the inflation is formed to be concave upward toward the driver-side wall part 34B of the vehicle body-side wall part 105 (refer to FIG. 23). That is, also in the airbag 100 of the third illustrative embodiment, since the concave part 107 is formed by making the airbag 100 (the bag main body 101) concave, it is possible to suppress the increase in volume. Also in the airbag 100 of the third illustrative embodiment, upon completion of the inflation of the airbag 100, when the driver MD is moved forward and is contacted to the rear part-side region (the rear part-side region 101b) of the airbag 100 (the bag main body 101) having inflated to cover the steering wheel W, the rear part-side region (the rear part-side region 101b) of the airbag 100 (the bag main body 101) is moved forward and can make the rear part-side region Rb of the ring part R enter into the rear region 107d of the concave part 107, as shown in FIG. 24. Accordingly, it is possible to stabilize the arrangement position of the airbag 100 relative to the steering wheel W (the ring part R) and to receive the driver MD moving forward by the airbag 100 arranged to cover the ring part R. Also in the airbag 100 of the third illustrative embodiment, the rear part-side region 101b of the airbag 100 (the bag main body 101) is pushed by the driver MD moving forward and is moved forward to make the ring part R enter into the concave part 107. Accordingly, it is possible to suppress the rear part-side region 101b from pressing the chest BA of the driver MD.

Also, in the airbag 100 of the third illustrative embodiment, the tether 111 is configured so that the spaced distance of the region (the upper end 111a, the upper joining region 114) joined to the driver-side wall part 34B from the central line CL3, which passes the center (the mounting center C4) of the inlet opening 24B and extends substantially in the upper and lower direction, is greater than the spaced distance of the region (the lower end 111b, the lower joining region 115) joined to the leading end (the upper end 107a) of the depression of the concave part 107 from the central line CL3. For this reason, upon completion of the inflation of the bag main body 101, the concave part 107 is pulled by the tether 111 and is arranged to be inclined relative to the central line CL3 so that the leading end (the upper end 107a) of the depression is to face toward the side distant from the inlet opening 24B (the outer side distant from the central line CL3 (refer to FIG. 23). In other words, the concave part 107 is arranged with being inclined in the rear and lower direction at the rear part-side region 101b. Therefore, upon completion of the inflation of the airbag 100, when the driver MD is moved forward and is contacted to the rear part-side region (the rear part-side region 101b) of the airbag 100, even though the driver is contacted to the rear part-side region 101b so that the rear part-side region is obliquely pushed up toward the front, it is possible to make the ring part R smoothly enter into the concave part 107 inclined in the rear and lower direction.

Specifically, in the airbag 100 of the third illustrative embodiment, the region (the upper end 111a, the upper joining region 114) of the tether 111 to be joined to the driver-side wall part 34B is configured to be arranged at the outermore side than the ring part R upon completion of the inflation of the airbag 100. Accordingly, the concave part 107 can be arranged to be largely inclined relative to the central line CL3 by the tether 111, so that it is possible to make the ring part R enter into the concave part 107 more correctly upon the receiving of the driver MD. On the other hand, if the above points are not considered, the upper end side (the upper joining region) of the tether may be configured to be arranged at a more inner position than the ring part upon completion of the inflation of the airbag.

Figure 25:
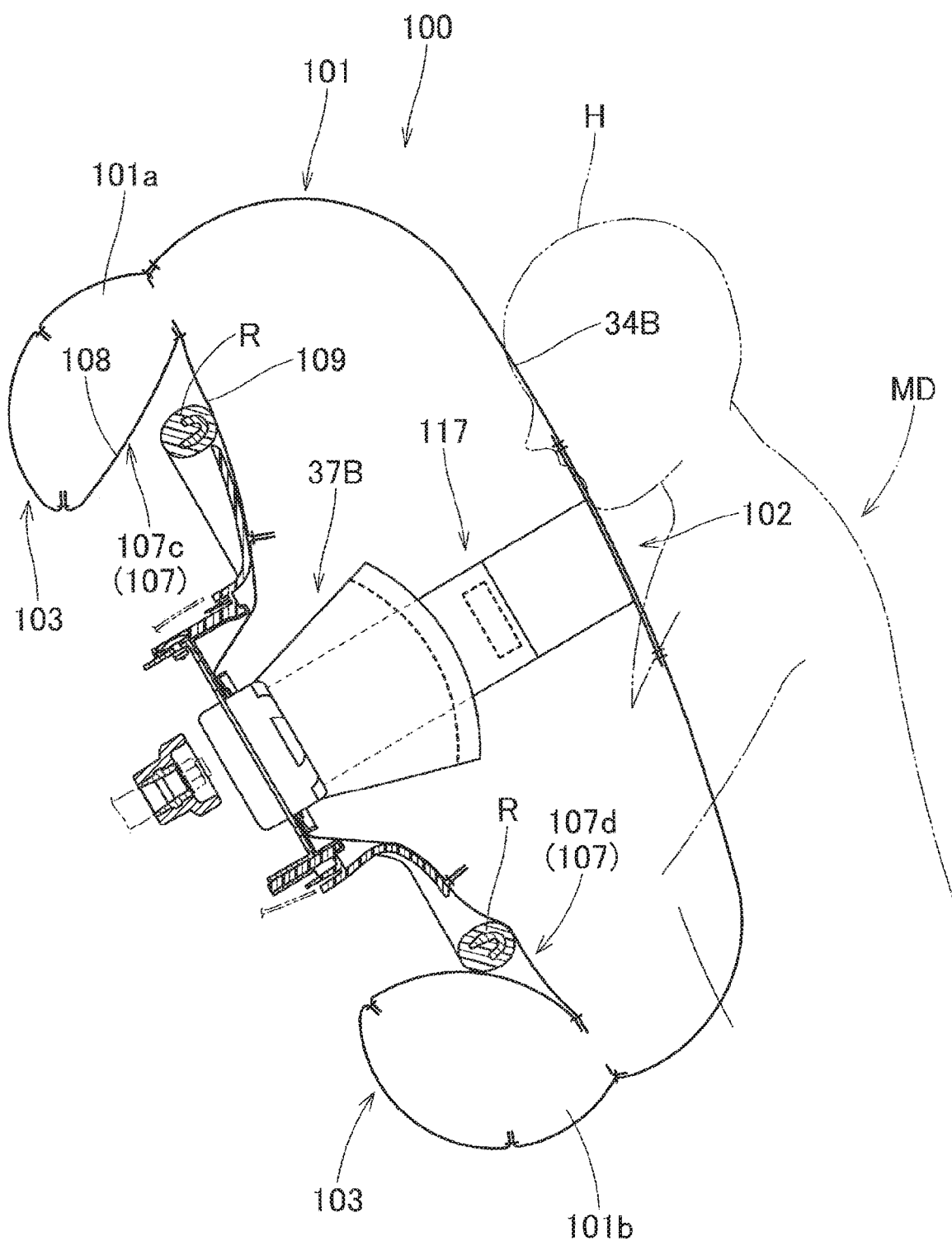
FIG. 25 is a schematic longitudinal sectional view depicting a state where the airbag after completion of the inflation in the airbag device for steering wheel, in which the airbag of the third illustrative embodiment is used, has received a head of the driver moving forward.

Also, in the airbag 100 of the third illustrative embodiment, the inner wall part 109, which is to be arranged at the inlet opening 24B side upon completion of the inflation, of the concave part 107 is configured so that the root part end (the lower end 109b) which corresponds to the vehicle body-side wall part 105 side is to be arranged at the inner position closer to the inlet opening 24B than the ring part R upon completion of the inflation of the airbag 100. Upon completion of the inflation of the airbag 100, after receiving the chest BA by the rear part-side region 101b, when the head H of the driver MD is contacted to the front part-side region (the front part-side region 101a) of the airbag 100, the front part-side region 101a is moved forward to make the ring part R enter into the concave part 107. At this time, in the airbag 100 of the third illustrative embodiment, since the inner wall part 109 of the concave part 107 has the lower end 109b arranged at the more inner side than the ring part R, the inner wall part 109 is contacted to the ring part R, so that it is possible to suppress the ring part R from moving to the leading end (the upper end 107a) of the depression of the concave part 107 (refer to FIG. 25). For this reason, it is possible to stably protect the head H by the inflated part having secured the thickness dimension in a state where the bottoming is suppressed by the region around the concave part 107. On the other hand, if the above points are not considered, the lower end of the inner wall part may be configured to be arranged at an outermore position than the ring part upon completion of the inflation of the airbag.

Also, in the airbag 100 of the third illustrative embodiment, the outer wall part 108, which is arranged at the side distant from the inlet opening 24B and faces the inner wall part 109, of the concave part 107 is configured so that the root part end (the lower end 109b) which corresponds to the vehicle body-side wall part 105 side is to be arranged at the outer position, which is a side more distant from the inlet opening 24B than the ring part R upon completion of the inflation of the airbag 100. Thereby, upon completion of the inflation of the airbag 100, it is possible to widely open the root part (the lower end 107b)-side region of the concave part 107. Therefore, when the driver MD is moved forward and is contacted to the rear part-side region 101b of the airbag 100, it is possible to make the ring part R further smoothly enter into the concave part 107 at the rear part-side region 101b.

Also, in the airbag 100 of the third illustrative embodiment, the concave part 107 is arranged at the position at which the center C5 substantially coincides with the rotation center C2 of the ring part R of the steering wheel W upon completion of the inflation of the airbag 100. Therefore, even though the airbag 100 inflates upon rotation of the steering wheel W, it is possible to make the ring part R stably enter into the concave part 107 when the driver having moved forward is contacted to the airbag 100. On the other hand, if the above points are not considered, the concave part may also be arranged at a position at which the center deviates from the rotation center of the ring part and substantially coincides with the center of the inlet opening of the bag main body, like the airbags 20, 80 of the first illustrative embodiment and the second illustrative embodiment.

Also, in the airbag 100 of the third illustrative embodiment, the tether 111 is configured to continuously couple the leading end (the upper end 107a) of the depression of the concave part 107 and the driver-side wall part 34B, as a substantially cylindrical shape upon completion of the inflation of the airbag 100, and the plurality of communication holes 112 configured to communicate an inside region (the central region 102) of the tether 111 and an outside region (the outer region 103) of the tether 111 in the bag main body 101 is arranged radially about the inlet opening 24B. That is, in the airbag 100 of the third illustrative embodiment, the bag main body 101 is demarcated into the central region 102 closer to the center side than the concave part 107 and the outer region 103 closer to the outer side than the concave part 107 by the tether 111, so that it is possible to rapidly inflate the central region 102 at an early stage of the inflation of the airbag 100 and to correctly protect the driver MD by the central region 102 in which an internal pressure is higher than the outer region of the tether 111. On the other hand, if the above points are not considered, the tether may be partially arranged in a radial fashion, like the tether configuring part of the airbag of the second illustrative embodiment.

According to an aspect of the invention, there is provided an airbag for steering wheel configured to allow an inflation gas to flow therein to inflate so as to cover an upper surface side of a ring part of a steering wheel, and comprising a vehicle body-side wall part to be arranged at a steering wheel side and a driver-side wall part to be arranged at a driver side upon completion of the inflation, wherein outer peripheral edges of the vehicle body-side wall part and the driver-side wall part of which outer shapes are made to substantially coincide with each other are joined such that the airbag is formed to have a bag shape, and an inlet opening which is opened so as to allow the inflation gas to flow therein and of which a peripheral edge is attached to the steering wheel side is arranged at a vicinity of a center of the vehicle body-side wall part, the vehicle body-side wall part is formed with a concave part to be concave upward toward the driver-side wall part upon completion of the inflation so that a rear part-side region of the ring part can be entered into the concave part, and the concave part is arranged at the vehicle body-side wall part so that the ring part is entered into the concave part when a driver is received by the airbag upon completion of the inflation.

In the airbag for steering wheel of the present invention, the concave part provided so that the ring part of the steering wheel can be entered therein upon completion of the inflation is formed to be concave upward toward the driver-side wall part at the vehicle body-side wall part. That is, in the airbag for steering wheel of the present invention, the concave part is not a partially protruding region, like the airbag for steering wheel of the related art, and is formed by recessing the airbag itself, so that it is possible to suppress an increase in volume. Also, in the airbag for steering wheel of the present invention, upon completion of the inflation of the airbag, when a driver is moved forward and is contacted to a rear part-side region of the airbag having inflated to cover the steering wheel, the rear part-side region of the airbag is moved forward to make the ring part enter into the concave part. Accordingly, it is possible to stabilize an arrangement position of the airbag relative to the steering wheel (ring part), and to stably receive the driver moving forward by the airbag arranged to cover the ring part. Also, in the airbag for steering wheel of the present invention, the rear part-side region of the airbag is pushed by the driver moving forward and is moved forward to make the ring part enter into the concave part. Accordingly, it is possible to suppress the rear part-side region from pressing a chest of the driver.

Accordingly, in the airbag for steering wheel of the present invention, it is possible to smoothly protect the driver with the simple configuration.

The concave part may be configured so that the driver-side wall part is arranged substantially along a vertical direction when the driver is received by the airbag upon completion of the inflation.

In the airbag for steering wheel configured as described above, as the rear part-side region of the airbag is moved forward, a front part-side region of the airbag arranged with the inlet opening being interposed with respect to the rear part-side region is arranged to float above the steering wheel, so that the driver-side wall part is arranged substantially along the vertical direction. For this reason, in the airbag for steering wheel configured as described above, upon completion of the inflation, when the driver is moved forward, it is possible to suppress the rear part-side region from pressing the chest of the driver, to receive an upper body of the driver over a wide range by the driver-side wall part arranged substantially along the vertical direction so as to substantially face the upper body of the driver, and to softly receive a head of the driver by the front part-side region to inflate in a relatively thick aspect.

Also, in the airbag for steering wheel configured as described above, the concave part may have a substantially circular arc shape substantially along the ring part, when the airbag upon completion of the inflation is seen in an upper and lower direction, because it is possible to make the circular ring-shaped ring part smoothly enter into the concave part.

Further, the concave part may have a substantially circular ring shape, when the airbag upon completion of the inflation is seen in the upper and lower direction, because even during an operation in a state where the steering wheel is rotated upon the steering, it is possible to easily make the ring part enter into the concave part.

The airbag may include a bag main body, and tethers arranged in the bag main body and configured to couple a leading end of a depression of the concave part to the driver-side wall part, and the tethers may be arranged at a plurality of places around the inlet opening and be respectively configured so that a spaced distance between a region joined to the driver-side wall part and a central line passing a center of the inlet opening and extending substantially in the upper and lower direction is smaller than a spaced distance between a region joined to the leading end of the depression of the concave part and the central line.

When the airbag for steering wheel is configured as described above, upon completion of the inflation of the bag main body, the concave part can be securely arranged in a concave shape and the concave part is pulled by the tethers, so that the leading end of the depression is arranged with being inclined toward the central line passing the center of the inlet opening. For this reason, the outer wall part that is arranged at an outer side of the concave part distant from the inlet opening becomes a guide surface, so that when making the ring part enter into the concave part, it is possible to make the ring part further smoothly enter into the concave part. Also, in the airbag for steering wheel configured as described above, the concave part is arranged so that the leading end faces toward the central line. Thereby, during the entering of the ring part into the concave part upon the receiving of the driver, when the ring part is entered up to the vicinity of the leading end of the concave part, the driver-side wall part is pulled downward. Therefore, even when the concave part is arranged in the substantially circular ring shape, it is possible to suppress the ring part from moving into a front region of the concave part arranged to face a rear region into which the ring part is entered.

A vehicle body-side panel configuring the vehicle body-side wall part in the bag main body, may comprises: an outer panel part having a substantially circular ring shape, of which an outer diameter dimension is substantially the same as an outer diameter dimension of a driver-side panel having a substantially circular shape and configuring the driver-side wall part, an outer peripheral edge of the outer panel part joined to an outer peripheral edge of the driver-side panel; a central panel part configuring a central region of the vehicle body-side wall part, including the inlet opening and having a substantially circular shape, of which an outer diameter dimension is greater than an inner diameter dimension of an opening region of the outer panel part; and an intermediate panel part arranged between the outer panel part and the central panel part and having a substantially circular ring shape, of which an outer diameter dimension is substantially the same as an outer diameter dimension of the central panel part, an inner diameter dimension of an opening region of the intermediate panel part being substantially the same as the inner diameter dimension of the opening region of the outer panel part, an outer peripheral edge of the intermediate panel part joined to an outer peripheral edge of the central panel part, an inner peripheral edge of the intermediate panel part joined to an inner peripheral edge of the outer panel part. End portions of the tethers facing toward the concave part may be joined to a region between the outer peripheral edge and the inlet opening in the central panel part.

When the airbag for steering wheel is configured as described above, it is possible to form the airbag having the concave part by a two-dimensional joining operation, so that it is possible to conveniently perform the manufacturing operation.

A vehicle body-side panel configuring the vehicle body-side wall part in the bag main body, may comprise: an outer panel part having a substantially circular ring shape, of which an outer diameter dimension is substantially the same as an outer diameter dimension of a driver-side panel having a substantially circular shape and configuring the driver-side wall part, an outer peripheral edge of the outer panel part joined to an outer peripheral edge of the driver-side panel; a central panel part configuring a central region of the vehicle body-side wall part, including the inlet opening and having a substantially circular shape, of which an outer diameter dimension is substantially the same as an inner diameter dimension of an opening region of the outer panel part; and a panel part for concave part arranged between the outer panel part and the central panel part and configuring the concave part. The panel part for concave part may include: an outer region having a band shape which is curved into a substantially circular arc shape, and arranged at the outer panel part side so that an outer edge is joined to an inner peripheral edge of the outer panel part; and an inner region having a band shape where end edges facing each other have linear shapes substantially parallel with each other, and arranged at the central panel part side so that one of the end edges is joined to an outer peripheral edge of the central panel part. An inner edge of the outer region and the other end edge of the inner region may be joined to each other so that the concave part is formed. End portions of the tethers facing toward the concave part may be joined to the vicinity of a joining region in which the inner edge of the outer region and the other end edge of the inner region are joined to each other.

When the airbag for steering wheel is configured as described above, since the inner region and the outer region configuring the facing surfaces of the concave part are continuously arranged in a circumferential direction, respectively, it is possible to stabilize a depression shape of the concave part.

A flow regulating cloth configured to cover an upper side of the inlet opening and capable of regulating a flow of the inflation gas introduced into the bag main body in a front and rear direction may be arranged in the bag main body, and the tethers may be arranged in a radial manner in a region in which the tethers can avoid interference with the inflation gas to flow out from an opening of the flow regulating cloth, when the airbag upon completion of the inflation is seen in the upper and lower direction.

When the airbag for steering wheel is configured as described above, at an early stage of the inflation of the airbag, the inflation gas introduced into the bag main body flows toward both the front and rear sides via the flow regulating cloth and can widely deploy the bag main body in the front and rear direction, so that even when a gap between an abdominal region of the driver and the ring part is narrow, it is possible to make the bag main body rapidly enter into the narrow gap. Also, the tethers are arranged in the radial manner in a region where it is possible to avoid interference with the inflation gas to flow out from the opening of the flow regulating cloth. Thereby, it is possible to suppress the inflation gas flowing from the opening region of the flow regulating cloth from being influenced by the tethers, and to stabilize the depression shape of the concave part over a wide range by the tethers.

Also, the airbag may include a bag main body and a tether arranged in the bag main body and configured to couple a leading end of a depression of the concave part to the driver-side wall part, and the tether may be arranged at a plurality of places around the inlet opening and may be respectively configured so that a spaced distance between a region joined to the driver-side wall part and a central line passing a center of the inlet opening and extending substantially in the upper and lower direction is greater than a spaced distance between a region joined to the leading end of the depression of the concave part and the central line.

When the airbag for steering wheel is configured as described above, upon completion of the inflation of the bag main body, the concave part is pulled by the tether and is arranged with being inclined so that the leading end of the depression is to face toward the side distant from the inlet opening. Therefore, upon completion of the inflation of the airbag, when the driver is moved forward and is contacted to the rear part-side region of the airbag, even though the driver is contacted to the rear part-side region so that the rear part-side region is obliquely pushed up toward the front, it is possible to make the ring part smoothly enter into the concave part.

Specifically, the tether may be configured so that the region joined to the driver-side wall part be arranged at an outermore side than the ring part upon completion of the inflation of the airbag. Thereby, the concave part can be arranged to be largely inclined relative to the central line by the tether, so that it is possible to make the ring part enter into the concave part more correctly upon the receiving of the driver.

Also, the concave part may include an inner wall part arranged at a side of the inlet opening upon completion of the inflation of the airbag and an outer wall part arranged at a side distant from the inlet opening and facing the inner wall part, and the inner wall part may be configured so that a root part end which is a side of the vehicle-side wall part is arranged at an inner position, which is a side closer to the inlet opening than the ring part upon completion of the inflation of the airbag.

When the airbag for steering wheel is configured as described above, upon completion of the inflation of the airbag, after the chest is received by the rear part-side region, when the head of the driver is contacted to the front part-side region of the airbag, the front part-side region is moved forward to make the ring part enter into the concave part. However, at this time, the inner wall part of the concave part is contacted to the ring part, so that the ring part can be suppressed from moving to the leading end of the depression of the concave part. For this reason, it is possible to stably protect the head by the inflated part having secured the thickness dimension in a state where the bottoming is suppressed by the region around the concave part.

Also, the outer wall part may be configured so that a root part end which is a side of the vehicle-side wall part is arranged at an outer position, which is a side more distant from the inlet opening than the ring part upon completion of the inflation of the airbag. Thereby, upon completion of the inflation of the airbag, it is possible to widely open the root part-side region of the concave part. Therefore, when the driver is moved forward and is contacted to the rear part-side region of the airbag, it is possible to make the ring part further smoothly enter into the concave part at the rear part-side region.

Also, the concave part may be configured so that a center is arranged at a position at which the center substantially coincides with a rotation center of the ring part of the steering wheel upon completion of the inflation of the airbag. Thereby, even though the airbag inflates upon rotation of the steering wheel, it is possible to make the ring part stably enter into the concave part when the driver having moved forward is contacted to the airbag.

Also, the tether may be configured to continuously couple the leading end of the depression of the concave part and the driver-side wall part, as a substantially cylindrical shape upon completion of the inflation of the airbag, and a plurality of communication holes configured to communicate an inside region of the tether and an outside region of the tether in the bag main body may be arranged radially about the inlet opening. Thereby, the bag main body is demarcated into a region closer to a center-side than the concave part and a region closer to the outer side than the concave part by the tether, so that it is possible to rapidly inflate the central region at an early stage of the inflation of the airbag and to correctly protect the driver by the central region in which an internal pressure is higher than the outer region of the tether.

What is claimed is:
1. An airbag for a steering wheel configured to allow an inflation gas to flow therein to inflate so as to cover an upper surface side of a ring part of the steering wheel, and comprising a vehicle body-side wall part to be arranged at a steering wheel side and a driver-side wall part to be arranged at a driver side upon completion of the inflation, wherein
    outer peripheral edges of the vehicle body-side wall part and the driver-side wall part of which outer shapes are made to substantially coincide with each other are joined such that the airbag is formed to have a bag shape, and an inlet opening which is opened so as to allow the inflation gas to flow therein and of which a peripheral edge is attached to the steering wheel side is arranged at a vicinity of a center of the vehicle body-side wall part, the vehicle body-side wall part is formed with a concave part to be concave upward toward the driver-side wall part upon completion of the inflation so that a rear part-side region of the ring part can be entered into the concave part, the concave part is arranged at the vehicle body-side wall part so that the ring part is entered into the concave part when a driver is received by the airbag upon completion of the inflation, the concave part has a substantially circular arc shape substantially along the ring part, when the airbag upon completion of the inflation is seen in an upper and lower direction, the concave part has a substantially circular ring shape, when the airbag upon completion of the inflation is seen in the upper and lower direction, the airbag includes a bag main body, and tethers arranged in the bag main body and configured to couple a leading end of a depression of the concave part to the driver-side wall part, the tethers are arranged at a plurality of places around the inlet opening and are respectively configured so that a spaced distance between a region joined to the driver-side wall part and a central line passing a center of the inlet opening and extending substantially in the upper and lower direction is smaller than a spaced distance between a region joined to the leading end of the depression of the concave part and the central line, a vehicle body-side panel configuring the vehicle body-side wall part in the bag main body, comprises:
  an outer panel part having a substantially circular ring shape, of which an outer diameter dimension is substantially the same as an outer diameter dimension of a driver-side panel having a substantially circular shape and configuring the driver-side wall part, an outer peripheral edge of the outer panel part joined to an outer peripheral edge of the driver-side panel;
  a central panel part configuring a central region of the vehicle body-side wall part, including the inlet opening and having a substantially circular shape, of which an outer diameter dimension is greater than an inner diameter dimension of an opening region of the outer panel part; and
  an intermediate panel part arranged between the outer panel part and the central panel part and having a substantially circular ring shape, of which an outer diameter dimension is substantially the same as an outer diameter dimension of the central panel part, an inner diameter dimension of an opening region of the intermediate panel part being substantially the same as the inner diameter dimension of the opening region of the outer panel part, an outer peripheral edge of the intermediate panel part joined to an outer peripheral edge of the central panel part, an inner peripheral edge of the intermediate panel part joined to an inner peripheral edge of the outer panel part, and end portions of the tethers facing toward the concave part are joined to a region between the outer peripheral edge and the inlet opening in the central panel part.

2. An airbag for a steering wheel configured to allow an inflation gas to flow therein to inflate so as to cover an upper surface side of a ring part of the steering wheel, and comprising a vehicle body-side wall part to be arranged at a steering wheel side and a driver-side wall part to be arranged at a driver side upon completion of the inflation, wherein outer peripheral edges of the vehicle body-side wall part and the driver-side wall part of which outer shapes are made to substantially coincide with each other are joined such that the airbag is formed to have a bag shape, and an inlet opening which is opened so as to allow the inflation gas to flow therein and of which a peripheral edge is attached to the steering wheel side is arranged at a vicinity of a center of the vehicle body-side wall part, the vehicle body-side wall part is formed with a concave part to be concave upward toward the driver-side wall part upon completion of the inflation so that a rear part-side region of the ring part can be entered into the concave part, the concave part is arranged at the vehicle body-side wall part so that the ring part is entered into the concave part when a driver is received by the airbag upon completion of the inflation, the concave part has a substantially circular arc shape substantially along the ring part, when the airbag upon completion of the inflation is seen in an upper and lower direction, the concave part has a substantially circular ring shape, when the airbag upon completion of the inflation is seen in the upper and lower direction, the airbag includes a bag main body, and tethers arranged in the bag main body and configured to couple a leading end of a depression of the concave part to the driver-side wall part, the tethers are arranged at a plurality of places around the inlet opening and are respectively configured so that a spaced distance between a region joined to the driver-side wall part and a central line passing a center of the inlet opening and extending substantially in the upper and lower direction is smaller than a spaced distance between a region joined to the leading end of the depression of the concave part and the central line, a vehicle body-side panel configuring the vehicle body-side wall part in the bag main body, comprises:
  an outer panel part having a substantially circular ring shape, of which an outer diameter dimension is substantially the same as an outer diameter dimension of a driver-side panel having a substantially circular shape and configuring the driver-side wall part, an outer peripheral edge of the outer panel part joined to an outer peripheral edge of the driver-side panel;
  a central panel part configuring a central region of the vehicle body-side wall part, including the inlet opening and having a substantially circular shape, of which an outer diameter dimension is substantially the same as an inner diameter dimension of an opening region of the outer panel part; and
  a panel part for concave part arranged between the outer panel part and the central panel part and configuring the concave part, the panel part for concave part includes:
  an outer region having a band shape which is curved into a substantially circular arc shape, and arranged at the outer panel part side so that an outer edge is joined to an inner peripheral edge of the outer panel part; and
  an inner region having a band shape where end edges facing each other have linear shapes substantially parallel with each other, and arranged at the central panel part side so that one of the end edges is joined to an outer peripheral edge of the central panel part, an inner edge of the outer region and the other end edge of the inner region are joined to each other so that the concave part is formed, and end portions of the tethers facing toward the concave part are joined to the vicinity of a joining region in which the inner edge of the outer region and the other end edge of the inner region are joined to each other.

3. An airbag for a steering wheel configured to allow an inflation gas to flow therein to inflate so as to cover an upper surface side of a ring part of the steering wheel, and comprising a vehicle body-side wall part to be arranged at a steering wheel side and a driver-side wall part to be arranged at a driver side upon completion of the inflation, wherein outer peripheral edges of the vehicle body-side wall part and the driver-side wall part of which outer shapes are made to substantially coincide with each other are joined such that the airbag is formed to have a bag shape, and an inlet opening which is opened so as to allow the inflation gas to flow therein and of which a peripheral edge is attached to the steering wheel side is arranged at a vicinity of a center of the vehicle body-side wall part, the vehicle body-side wall part is formed with a concave part to be concave upward toward the driver-side wall part upon completion of the inflation so that a rear part-side region of the ring part can be entered into the concave part, the concave part is arranged at the vehicle body-side wall part so that the ring part is entered into the concave part when a driver is received by the airbag upon completion of the inflation, the concave part has a substantially circular arc shape substantially along the ring part, when the airbag upon completion of the inflation is seen in an upper and lower direction, the concave part has a substantially circular ring shape, when the airbag upon completion of the inflation is seen in the upper and lower direction, the airbag includes a bag main body and a tether arranged in the bag main body and configured to couple a leading end of a depression of the concave part to the driver-side wall part, the tether is arranged at a plurality of places around the inlet opening and is respectively configured so that a spaced distance between a region joined to the driver-side wall part and a central line passing a center of the inlet opening and extending substantially in the upper and lower direction is greater than a spaced distance between a region joined to the leading end of the depression of the concave part and the central line, and the tether is configured to continuously couple the leading end of the depression of the concave part and the driver-side wall part, as a substantially cylindrical shape upon completion of the inflation of the airbag, and a plurality of communication holes configured to communicate an inside region of the tether and an outside region of the tether in the bag main body are arranged radially about the inlet opening.

\* \* \* \* \*